US008411151B2

(12) United States Patent
Bone et al.

(10) Patent No.: US 8,411,151 B2
(45) Date of Patent: Apr. 2, 2013

(54) SYSTEM FOR, AND METHOD OF, PROCESSING AN IMAGE

(75) Inventors: Gregory A. Bone, Santa Monica, CA (US); Jonathan M. Walton, Newport Beach, CA (US)

(73) Assignee: IQinVision, Inc., San Juan Capistrano, CA (US)

( * ) Notice: Subject to any disclaimer, the term of this patent is extended or adjusted under 35 U.S.C. 154(b) by 1097 days.

(21) Appl. No.: 10/113,480

(22) Filed: Mar. 29, 2002

(65) Prior Publication Data

US 2003/0193570 A1 Oct. 16, 2003

(51) Int. Cl.
*H04N 5/225* (2006.01)
*H04N 5/228* (2006.01)

(52) U.S. Cl. .................................................. 348/207.11

(58) Field of Classification Search .............. 348/207.1, 348/207.11, 231.2, 231.6, 231.9
See application file for complete search history.

(56) References Cited

U.S. PATENT DOCUMENTS

| | | | |
|---|---|---|---|
| 4,601,055 A | | 7/1986 | Kent |
| 5,596,420 A | * | 1/1997 | Daum .............................. 386/241 |
| 5,754,422 A | * | 5/1998 | Lowles et al. ....................... 700/1 |
| 5,868,666 A | * | 2/1999 | Okada et al. ..................... 600/118 |
| 6,167,469 A | * | 12/2000 | Safai et al. ....................... 710/62 |
| 6,188,381 B1 | | 2/2001 | Van der Wal et al. |
| 6,710,799 B2 | * | 3/2004 | Abnet et al. .................... 348/135 |
| 6,753,925 B2 | * | 6/2004 | Limaye ......................... 348/515 |
| 6,804,394 B1 | * | 10/2004 | Hsu ................................ 382/173 |
| 6,816,200 B1 | * | 11/2004 | Gough .......................... 348/362 |
| 6,900,777 B1 | * | 5/2005 | Hebert et al. ....................... 345/7 |
| 2001/0036322 A1 | | 11/2001 | Bloomfield et al. |
| 2003/0081780 A1 | * | 5/2003 | Kim .............................. 380/252 |
| 2004/0150734 A1 | * | 8/2004 | Sobel et al. .................... 348/272 |
| 2004/0201743 A1 | * | 10/2004 | Amling et al. ............. 348/231.6 |

FOREIGN PATENT DOCUMENTS

| | | |
|---|---|---|
| EP | 1132863 A1 | 1/2001 |
| GB | 2340358 A | 2/2000 |
| WO | WO 00/36562 | 6/2000 |

OTHER PUBLICATIONS

XP 000022980, Jun. 21, 1987, Toriu, et al.

* cited by examiner

*Primary Examiner* — Chieh M Fan
*Assistant Examiner* — Carramah J Quiett
(74) *Attorney, Agent, or Firm* — Fulwider Patton LLP

(57) ABSTRACT

A software development kit prioritizes certain aspects of an acquired image and introduces the prioritized aspects to a main processor. Alternatively, a coprocessor, or the coprocessor and the development kit, manipulate(s) the acquired image and introduce(s) the manipulated image to the processor. The reprogramming of either one of the development kit and the coprocessor may be initiated by either one of them or by the processor and the programming may be provided by the main processor. A central station and a gate array may also be individually reprogrammable by the main processor which sets up, programs and controls an intelligent imaging platform in accordance with the individual reprogrammings. A reprogramming of an audio acquisition stage may also be initiated by that stage and any of the other stages and the processor and may be provided by the processor. The audio information may be related to the acquired image.

146 Claims, 11 Drawing Sheets

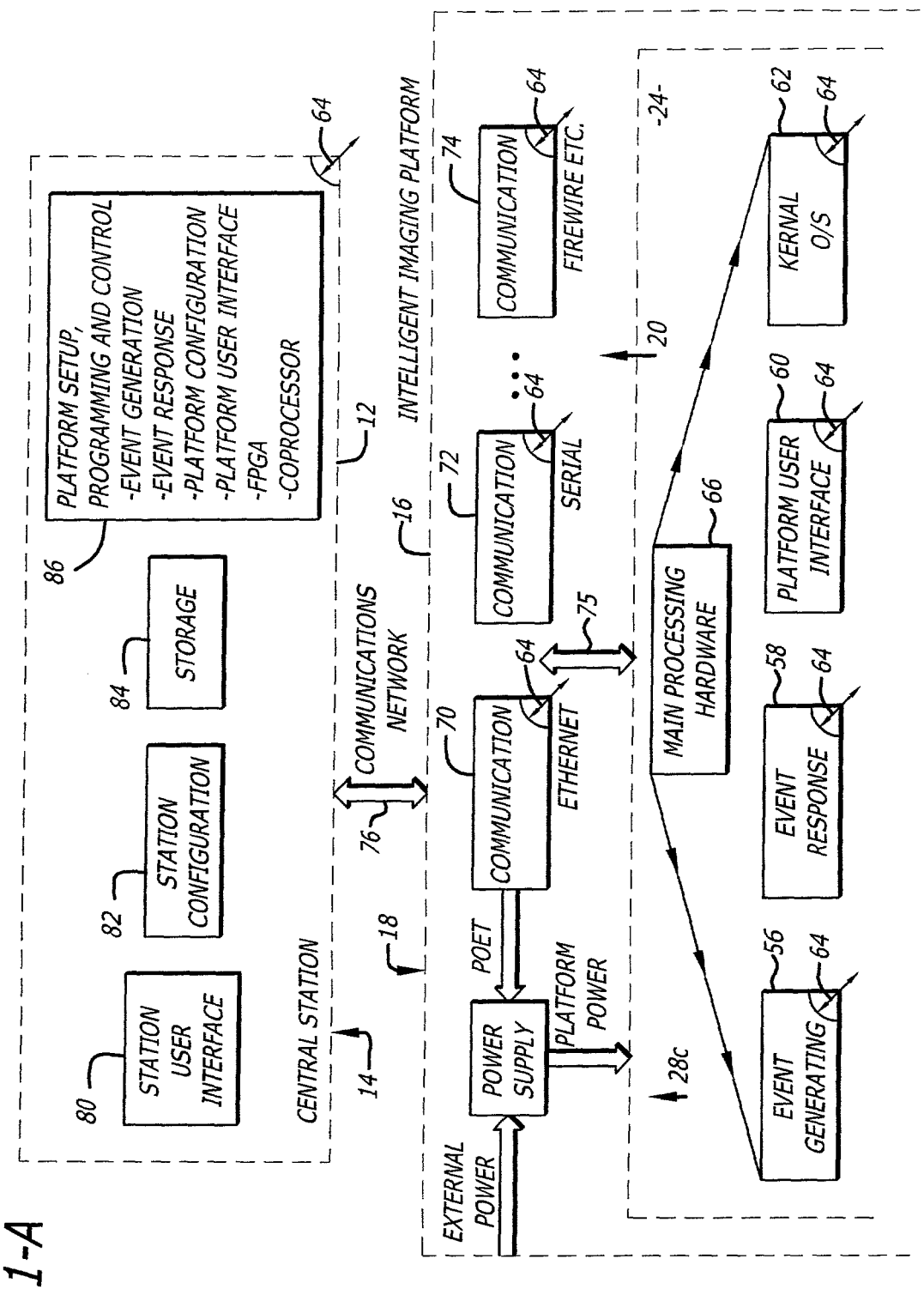
FIG. 1-A

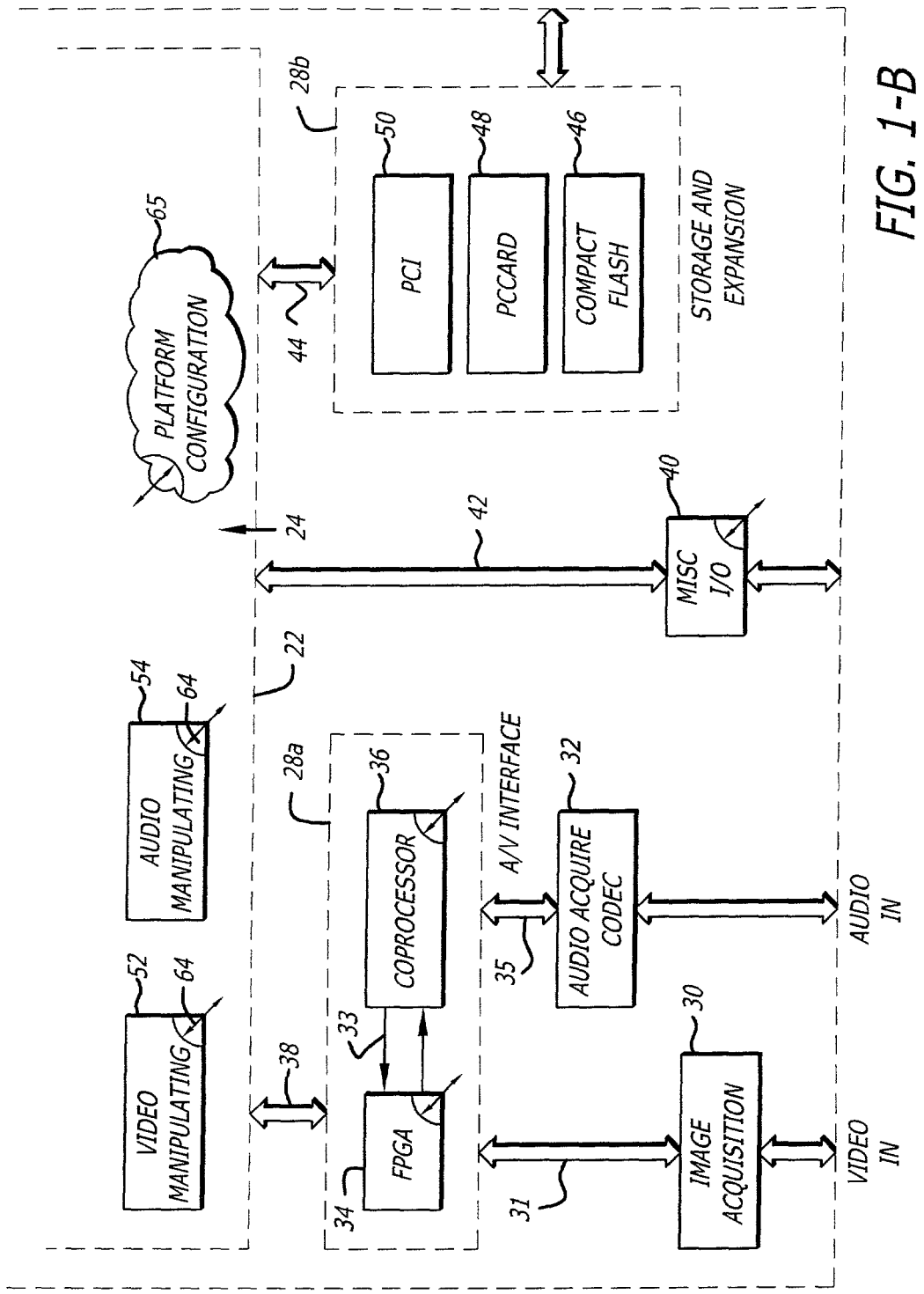
FIG. 1-B

FIG. 7-A

| | Main Function | Other/Combined Functions | Pre-Process | Analyze | Event Generation | Event Response |
|---|---|---|---|---|---|---|
| 1 | Remote Color Video monitor with Archive | | Color Correction | | | |
| 1B | | With Audio Monitoring Also | Color Correction | | | |
| 2 | Face Print Generation and Upload to Server | | Facial Feature Extraction | Face Paint Generation | Face Detected | Initiate Face Print Upload to Server |
| 2B | | Generate "Face Present" Audio Alert | Facial Feature Extraction | Face Paint Generation | Face Detected | Initiate Face Print Upload to Server AND Initiate Audio Alert |
| 2C | | Recognize Face And Alert Server of Match | Facial Feature Extraction | Face Paint Generation | Face Detected AND Run Database Match Search | Initiate Face Match Notification to Server |
| 2D | | Recognize Multiple Faces Simultaneous | Facial Feature Extraction | Face Paint Generation | Face Detected AND Run Database Match Search | Initiate Face Match Notification to Server |
| 3 | Gun Shot Detection and Server Notification | | | | Gun Shot Detected | |

FIG. 7-B

| Storage/Disk | Post Process | Communication | Misc Output | Audio Pre-Process | Audio Analyze | Notes |
|---|---|---|---|---|---|---|
| Archive Video | Compress Video | Format Data for Ethernet Protocol | | | | |
| Archive Video And Audio | Compress Video and Audio | Format Data for Ethernet Protocol | | Input Sound Level Control | | |
| | | Format Data for Ethernet Protocol | | | | |
| | | Format Data for Ethernet Protocol | Generate Audio Alert | | | |
| Contains Face Print Searchable Database | | Format Data for Ethernet Protocol | | | | |
| Contains Face Print Searchable Database | | Format Data for Ethernet Protocol | | | | Utilizes FPGA and CO-Processing for added Processing power |
| | | Format Data for Ethernet Protocol | | Selective Audio Filter | Analyze for Gun Shot | |

| | Col1 | Col2 | Col3 | Col4 | Col5 |
|---|---|---|---|---|---|
| 3A | AFTER Gun Shot Detection, Re-Task for Remote Monitor with Archive main function (1, 1B) | | | Gun Shot Detected | Re-Task Platform for functions 1 or 1B |
| 3B | AFTER Gun Shot Detection, Re-Task for Face Print Generation (2, 2C, 2D) | | | Gun Shot Detected | Re-Task Platform for functions 1 or 1B |
| | Subject Tracking with Realtime Video Monitor | | | | |
| 4 | With Mechanical Pan/Tilt/Zoom Control | Subject Feature(s) Extraction | Subject Detection/ Motion Estimation | Subject Re-Framing Required | Control Pan/Tilt/Zoom Unit to re-frame Subject |
| 4B | With Digital Pan/Tilt/Zoom Control | Subject Feature(s) Extraction | Subject Detection/ Motion Estimation | Subject Re-Framing Required | Control Pan/Tilt/Zoom Window to re-frame Subject |
| 4C | Multiple Subject Tracking with Digital Pan/Tilt/Zoom | Subject Feature(s) Extraction | Subject Detection/ Motion Estimation | Subject Re-Framing Required | Control Pan/Tilt/Zoom Window to re-frame Subject |

FIG. 7-C

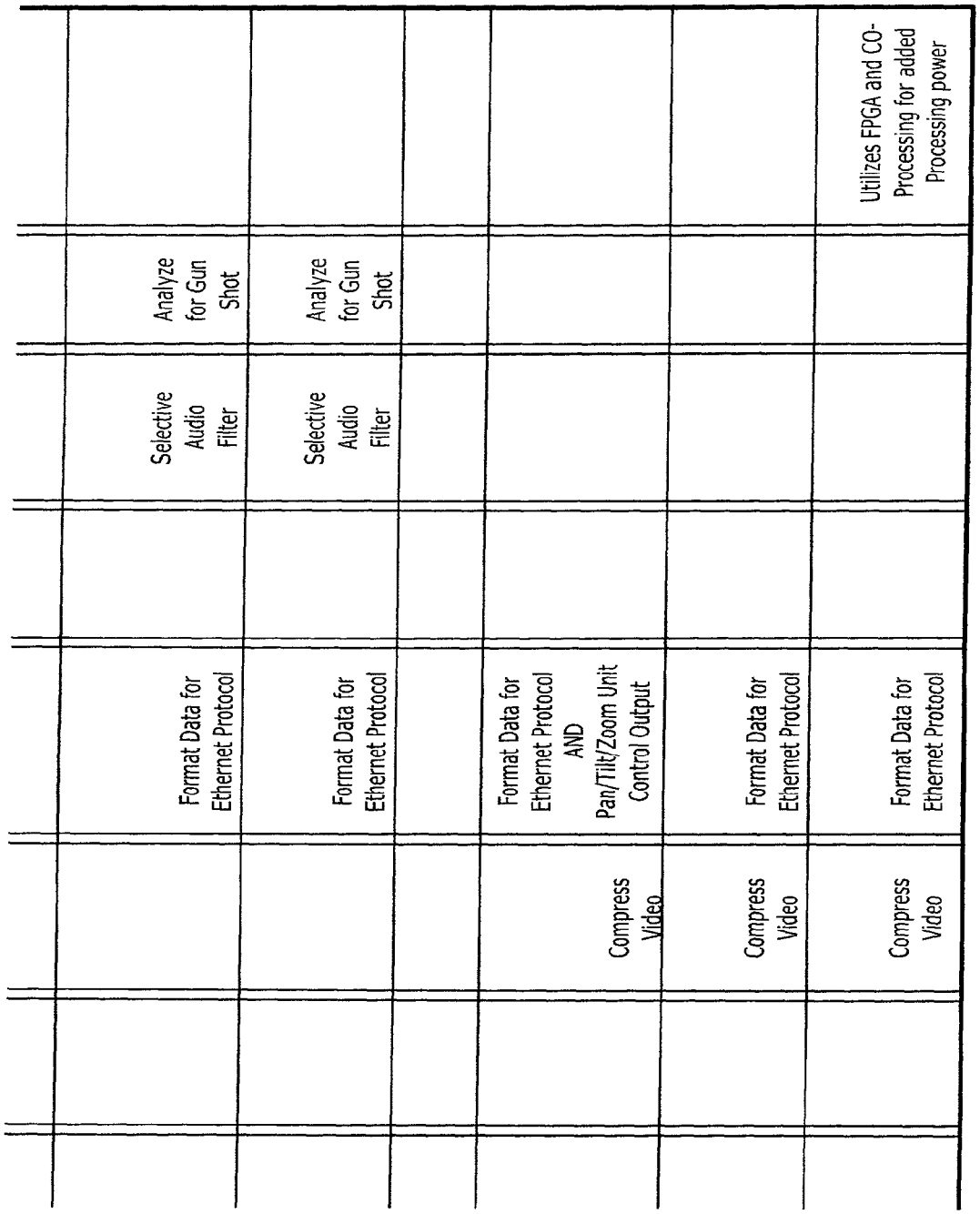
FIG. 7-D

SYSTEM FOR, AND METHOD OF, PROCESSING AN IMAGE

This invention relates to a system for and method of processing an acquired image. More particularly, the invention relates to a system for, and method of, processing an image in a wide variety of ways, not previously capable of being accomplished in the prior art, to provide results which are enhanced compared to what has been able to be achieved in the prior art.

BACKGROUND OF THE INVENTION

Systems are now in use for processing an acquired image. For example, systems are now in use for processing an acquired image to determine the entrance into, and the departure of individuals from, a defined area such as an enclosure. Systems are also in use for determining the identity of individuals and objects in an enclosure. Systems are further in use for tracking the movement and variations in the positioning of individuals in an enclosure. These are only a few examples of different types of processing and uses of acquired images.

As of now, different processing and uses of acquired images require different types of systems to be constructed. For example, the same system cannot be used to identify an individual in a crowd and to track the movement of the identified individual in the crowd and particularly the movement of the individual in a defined area such as an enclosure or from one defined area to another defined area. The same system cannot also be used to magnify a particular portion of an acquired image and process that magnified portion. Since different systems are required to perform different functions, costs to individuals or organizations have increased, available space has become limited and complexities in operation have become magnified.

BRIEF DESCRIPTION OF A PREFERRED EMBODIMENT OF THE INVENTION

A software development kit prioritizes certain aspects of an acquired image and introduces the prioritized aspects to a main processor. Alternatively, a coprocessor, or the coprocessor and the development kit, manipulate(s) the acquired image and introduce(s) the manipulated image to the processor. The reprogramming of either one of the development kit and the coprocessor may be initiated by either one of them and by the processor and the programming may be provided by the main processor.

A central station and a gate array may also be individually reprogrammable by the main processor which sets up, programs and controls a camera in accordance with the individual reprogrammings.

A reprogramming of an audio acquisition stage may also be initiated by that stage and any of the other stages and the processor and may be provided by the processor. The audio information may be related to the acquired image.

BRIEF DESCRIPTION OF THE DRAWINGS

In the drawings:

FIG. 1 is a diagram, primarily in block form, of a system (hardware and software) constituting a preferred embodiment of the invention for processing acquired images on a global basis where the system can be used to process the images in a wide variety of different ways;

FIG. 7 is a chart illustratively showing a number of individual functions that may be provided by the system shown in FIGS. 1-6 to accomplish different desired results in processing an acquired image.

DETAILED DESCRIPTION OF A PREFERRED EMBODIMENT OF THE INVENTION

Figure 2:
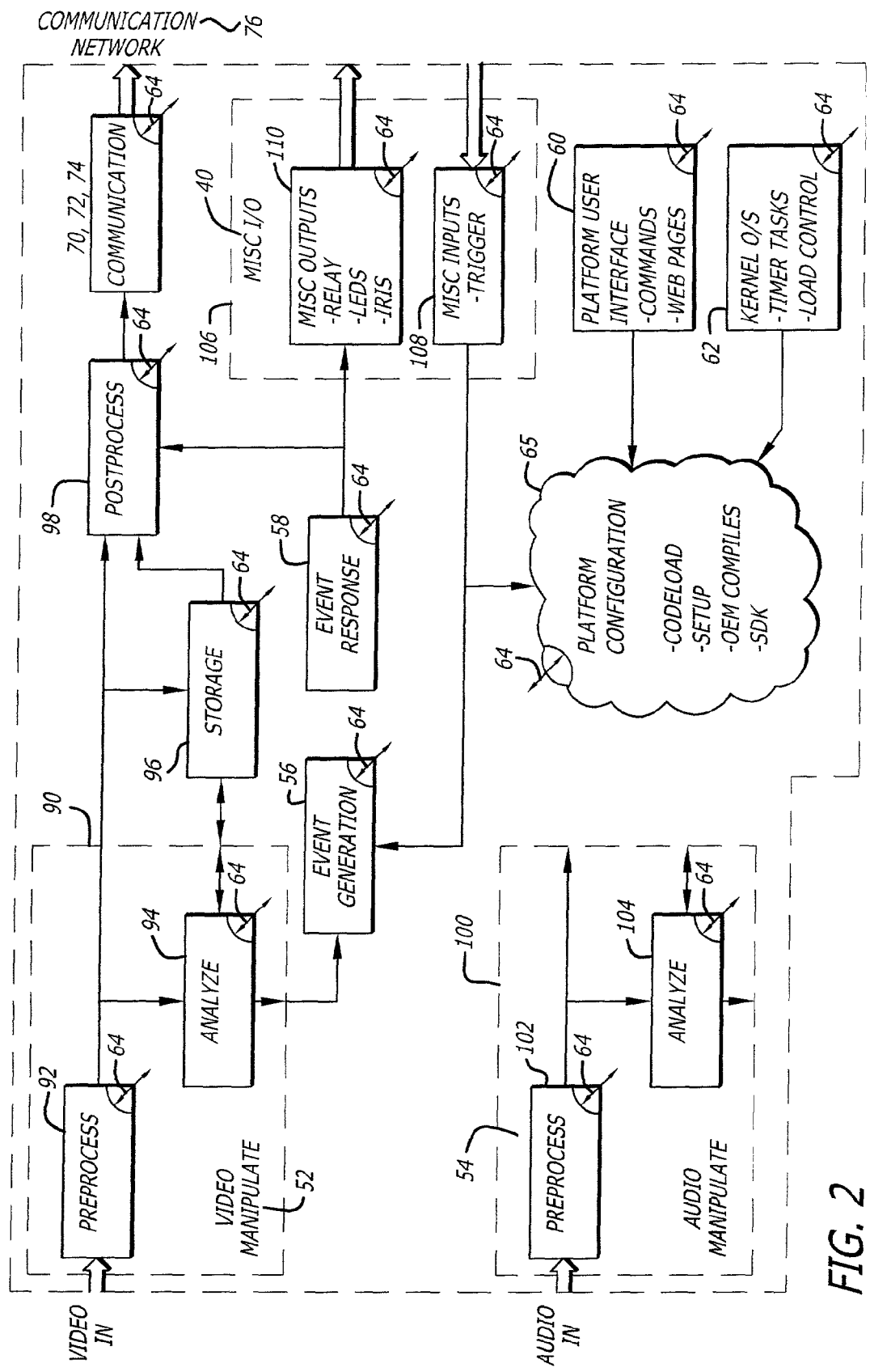
FIG. 2 is an expanded diagram, primarily in block form, of the software portion of the system shown in FIG. 1.

FIG. 1 is a circuit diagram, primarily in block form, of a system generally indicated at 10 and constituting a preferred embodiment of the invention. The system 10 is shown as being divided by broken lines 12 into a central station generally indicated at 14 and by broken lines 16 into an intelligent imaging platform generally indicated at 18. A communications arrangement formed by one or more communications channels and generally indicated at 20 is disposed in the intelligent imaging platform 18. The intelligent imaging platform 18 is in turn indicated by broken lines 22 as including a software section generally indicated at 24. Substantially everything within the broken lines 16 (except for the communications arrangement 20 and the software section 24) constitutes hardware generally indicated at 28a, 28b and 28c. The hardware section 28a may be considered to include software which interfaces with the hardware in the section.

The hardware section in FIG. 1 also includes an image acquirer 30 for receiving an image and converting the image to signals, preferably electrical, in a conventional manner. The hardware section also includes an audio codec or audio acquirer 32 for receiving audio information which may be related to the video information. The audio codec or acquirer 32 may include an audio coder decoder designated as a "codec". Signals pass through a bus 31 between the image acquirer 30 and a field programmable gate array 34 which may be constructed in a conventional manner. Signals also pass through a bus 33 between the gate array 34 and a coprocessor 36. The gate array 34 and the coprocessor 36 are disposed in the hardware section 28a.

The audio signals preferably pass through a bus 35 between the audio codec or acquirer 32 and the field reprogrammable gate array 34. However, the audio signals could pass through a bus between the audio codes or acquirer 32 and the coprocessor 36. The system is more flexible when the audio signals pass between the audio codec or acquirer 32 and the field reprogrammable gate array 34 than when the audio signals pass between the audio codec or acquirer 32 and the coprocessor 36. The ability of the signals from the audio acquirer 32 to pass to either the gate array 34 or the coprocessor 36 may be seen by the extension of the bus 35 to the audio/video interface for the hardware section 28a.

Signals pass between the hardware section 28a and the software section 24 through a bus 38. Signals also pass between a miscellaneous input/output stage 40 (considered as hardware) and the software section 24 through a bus 42. Signals also pass through the hardware section 28b and the software section 24 through a bus 44. The hardware section 28b includes a compact flash card interface 46, a PC card interface 48 and a PCI interface 50. The hardware section 28b provides information storage and includes a capacity for providing information storage expansion and other (non-storage) expansion.

The software section 24 includes a video manipulator 52, an audio manipulator 54, an event generator 56, an event responder 58, a platform user interface 60 and a kernel operating system 62. Each of these stages has an arrow 64 disposed in an oblique direction at the bottom right corner of the stage. The oblique arrow 64 indicates that the stage is capable of being reprogrammed. The reprogramming of any stage with the arrow 64 can be initiated by any stage whether the other stage has the arrow 64 to indicate its capability of being reprogrammed. For example, the reprogramming of any of the stages 34, 36 and 52-62 (even numbers only) can be self initiated and can be initiated by any of the other stages 34, 36 and 52-62 and by any other stages such as the stages 70, 72 and 74. Thus, each of the stages 34, 36 and 52-62 (even numbers only) is illustratively able to be reprogrammed. Thus, the stages 34, 36, 52-62 and 65 (even numbers only) receiving such communications have an enhanced flexibility in operation in comparison to the stages which do not receive such reprogramming. Each reprogrammable stage including the stages 34, 36 and 52-62 (even numbers only) can also initiate reprogramming of itself. The reprogramming of each reprogrammable stage including the stages 34, 36 and 52-62 (even numbers only) can be initiated by almost any stage in the system, except for the image acquirer 30, the audio acquirer or codec 32, the miscellaneous input/output 40 and the storage and expansion stage 28b.

A software development kit 65 is indicated by a cloud designated as "platform configuration" with an arrow 64 in the upper left corner. The output from the software development kit 65 is introduced to a main processor 66 to control the operation of the main processor. The software development kit may be considered to be within the main processor 66. The main processor 66 reprograms individual ones of the stages 34, 36 and 52-64 (even numbers only) and the software development kit 65 to control the image acquired by the stage 30 from the camera and the audio acquired by the stage 32 from the camera.

The field programmable gate array 34 provides reprogrammable arrays of gates to clarify and sharpen the video data acquired from the image acquisition stage 30 and introduces the clarified image to the coprocessor 36. The coprocessor 36 manipulates the audio and video data depending upon the results desired to be obtained from the system 10. For example, different manipulations may be provided by the coprocessor 36 when the image is targeted on a single person or a group of people or on an inanimate object. The miscellaneous input/output stage 40 provides such information as motion sensing to indicate to an alarm panel that the camera has observed and detected motion in a scene. The hardware section 40 can also indicate to the camera that some external device has detected motion and wishes to inform the camera that an event worth observing is taking place. In addition, the hardware section 40 may also indicate to a lens to change the size of the iris in the lens. It will be appreciated that the hardware section 40 may perform a considerable number of function other than motion detecting.

The video manipulate stage 52 may manipulate an image to clarify the image as by correcting for color or extracting facial features. This is especially important when faces are in the image and the faces are to be matched against a database identifying a particular face. A similar type of manipulation is provided by the stage 54 with respect to audio information such as when a person is speaking. The event generator 56 matches the image from the stage 52 against the images in the database. This is important when the images are faces. The event responder stage 58 provides a response depending on the matching or lack of matching of the acquired image from the stage 52 and the image in the database. Although the matching has been discussed with reference to faces, the matching can be with respect to any physical object or any perceived state independent of a physical object.

The event responder 58 acts upon the output from the event generator 56 in accordance with the processing which is provided to obtain the desired results. The platform user interface 60 provides a mechanism for taking the information that the camera intelligent imaging platform 18 sees and the platform 60 calculates that information and presents the calculated information to the user. It also allows for the user to adjust the setting of the camera. The platform configuration 65 allows the user of the system to write code for customizing the camera to provide the desired result. The kernel operating system 62 provides the basic operation of the camera. It is well known in the art.

Although the stages 52-62 (even numbers only) and 65 constitute software, they may be disposed in the hardware section 28c, since they control the operation of the main processing hardware 66. The main processing hardware 66 is sometimes referred to in this application as a "main processor". The main processor 66 is connected by the bus 25 to communication stages or channels in the intelligent imaging platform 18. The intelligent imaging platform 18 includes a subset of communication channels 70 (ethernet), 72 (serial) and 74 (firewire) in the communications arrangement 20. The channel 70 receives information from an Ethernet source. The channel 72 receives serial information from an external source. The channel 74 receives high speed information from software known as Firewire and communicates this information to hardware. The channels 70, 72 and 74 are representative of the different types of information that may be acquired by the currently active communication channels in the intelligent imaging platform 18. The representative channels such as the channels 70, 72 and 74 also receive information from the main processor 66 and supply information to the main processor.

The intelligent imaging platform 18 in turn communicates through the communications network 76 to the central station 14. As shown in FIG. 1, the central station 14 is reprogrammable and can initiate reprogramming of itself and any other reprogrammable stage. The central station 14 is shown as including a station user interface 80, a station configuration 82, storage 84 and a platform setup, programming and control 86. The platform setup 86 may include set up and configuration information for event generation, event response, platform configuration, platform user interface, field programmable gate array and coprocessor corresponding to what is shown in the intelligent imaging platform 18. The platform set up 86 is shown as being included in the central station 14 but it controls the state of the stages 34, 36, 52-62 (even numbers only) and the main processor 66 in the intelligent imaging platform 18.

The stage 30 acquires the image from the camera and introduces the acquired image to the field programmable gate array 34. The gate array 34 clarifies the image in accordance with the desired processing to be provided of the image and introduces the signals representing the clarified image to the coprocessor 36. The coprocessor 36 manipulates the clarified image dependent upon the desired result to be obtained from the system shown in FIG. 1. For example, the coprocessor 36 may manipulate the image to focus on an individual in a crowd and may track the movements of the individual. Alternatively, the coprocessor may manipulate the image to concentrate on what happens in a particular corner of a room. The coprocessor 36 is also able to manipulate the audio from the codec 32 to conform to the manipulation of the video. However, as indicated previously, the audio information may be clarified by the field reprogrammable gate array 34 before it is introduced to the coprocessor 36.

The signals from the coprocessor 36 are further manipulated by the stages 52 and 54. The video manipulator 52 further enhances the quality of the acquired image. For example, the video manipulator 52 may identify individual faces in a crowd and may extract facial features of an individual. The event generator 56 may match the facial features against a database to identify the individual on the basis of this matching against the database.

The system 10 shown in FIG. 1 has certain important advantages. It provides software (e.g. the stages 34, 36, 52-62 (even numbers only) and 65) in the camera to control the operation of the camera. In this way, the reprogramming of the software stages can occur instantaneously in the camera and the resultant changes in the output from the software stages can directly control the operation of the camera. This is in contrast to the prior art where output signals have been introduced to controls outside of the camera. In the prior art, the signals are then processed outside the camera and introduced to the controls outside of the camera. As will be appreciated, the passage of the signals outside of the camera and the subsequent processing of the signals outside of the camera produce a degradation in the camera performance.

The degradation of the signal resolution with increases in distance is particularly troublesome when analog signals are processed many of the camera systems of the prior art processed analog signals. In contrast, the system of this invention operates on a digital basis. Coupled with the disposition of the camera controls in the camera, the digital operation of the system of this invention enhances the sensitivity and the reliability of the operation of the system 10.

The system 10 also has other advantages. This results in part from the flexibility in the construction and operation of the system. For example, all of the stages 34, 36, 52-62 (even numbers only) and 65 are reprogrammable. Furthermore, each of the stages 34, 36, 52-62 and 65 can be reprogrammed on the basis of a decision from that stage or any of the other of these stages. This flexibility in reprogramming provides for an enhanced sensitivity and reliability in the adjustments that can be provided in the operation of the camera, thereby providing an enhanced performance of the camera.

FIG. 2 illustrates the software in additional detail. It includes the video manipulator 52, which is shown in broken lines 90 in FIG. 2. As shown in FIG. 2, the video manipulator 52 includes a preprocessor 92 and an analyzer 94. The preprocessor 92 converts the acquired image from the stage 30 in FIG. 1 to a format that the user wishes to provide. For example, the preprocessor 92 may correct, fix or establish colors in the acquired image or may select only a small portion of the image. The analyzer 94 may illustratively look for something specific in the image or in a portion of the image. For example, the analyzer 94 may look for an individual having a particular identity. Alternatively, the analyzer 94 may extract facial features or may detect motion of an image or an object. The operation of the event generator 56 and the event responder 58 have been indicated previously in connection with FIG. 1.

The output of the analyzer 92 is stored or archived as at 96 in FIG. 2 and the stored or archived output is introduced to a post processor 98. The post processor 98 illustratively provides for a modification of the image based upon the output of the analyzer 96 and the event responder 58. For example, the post processor 98 may emphasize image portions that have changed in position with time. The output of the post processor stage 98 is introduced to one of the stages 70, 72 and 74 in the communications network 20 in FIG. 1 and the output of the communications stage is provided to the communication network 76 also shown in FIG. 1.

The miscellaneous input/output stage 40 in FIG. 1 is also shown in additional detail in FIG. 2 within a block 106 in broken lines. The miscellaneous input/output stage 40 includes miscellaneous inputs 108 such as triggers and includes miscellaneous outputs 110 such as relays, light emitting diodes and an iris control port for the camera. The audio manipulator 54 in FIG. 1 is also shown in FIG. 2 within a box 100 formed from broken lines. The audio manipulator 100 in FIG. 2 includes a preprocessor 102 and an analyzer 104 which respectively operate on the audio in a manner similar to the operation of the preprocessor 92 and the analyzer 94 on the video in FIG. 2.

FIG. 2 also includes the platform user interface 60 and the kernel operating system 62 shown in FIG. 1. The platform user interface 60 includes commands and web pages and the kernel operating system 62 includes timer tasks and load control. The "load" refers to the work in performing the software tasks on the processor and the "load control" refers to the acts of organizing the tasks to make certain that all of the tasks are provided with an opportunity to occur. FIG. 2 also includes the platform configuration 65 also shown in FIG. 1. The platform configuration 65 includes code load, set-up, original equipment manufacturers (OEM) compiles and the software development kit (SDK). The platform configuration 65 and all of the other stages in FIG. 2 include the diagonal line 64 to indicate that each of the stages can talk to any of the other stages in FIG. 2 and can be reprogrammed by the main processor 66 on the basis of an initiation by any of the reprogrammable stages shown in FIG. 2.

Figure 3:
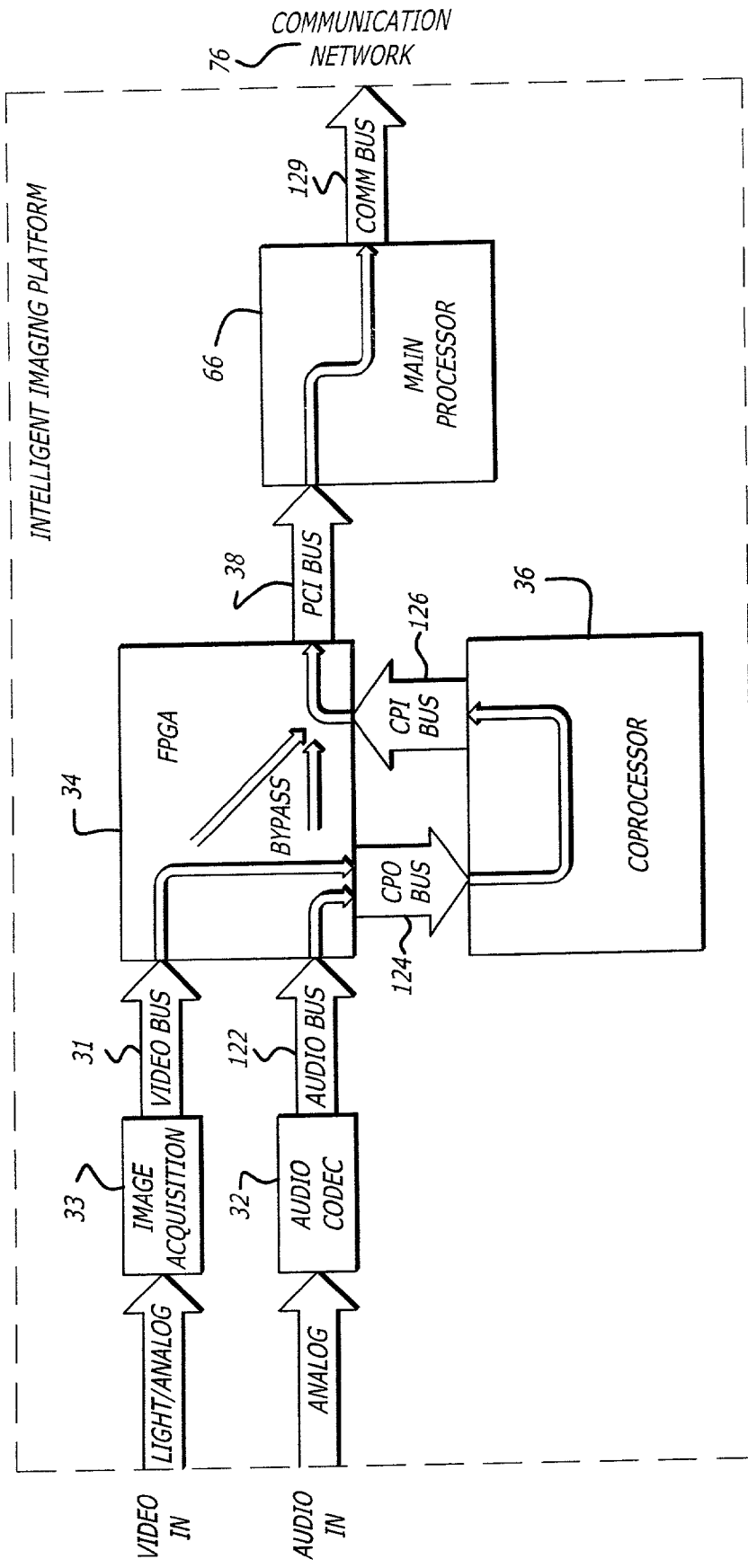
FIG. 3 is an expanded diagram, partially in block form, showing how different portions of the hardware in FIG. 1 are interconnected by buses.

FIG. 3 shows the acquisition of an image illustratively in either photonic (light) or analog form. FIG. 3 also indicates the flow of video and audio data through the hardware shown in FIG. 1. The video path includes the image acquisition of light illustratively in analog form as at 30 in FIGS. 1 and 3. The image is converted inside the image acquirer 30 into digital form either by using a combination of a lens and imager (for light) or by using an analog decoder—for example, an NTSC decoder—(for analog). The resultant signals flow through the video bus 31 to the field reprogrammable gate array 34 also shown in FIG. 1. The gate array 34 also receives audio signals flowing through a bus 122 from the audio codec or acquirer 32 also shown in FIG. 1.

The video and audio signals then flow through a bus 124 to the coprocessor 36. The output from the coprocessor 36 is provided to a bus 126. These signals then pass through the gate array 34 to PCI bus 38. The signals on the buses 120 and 122 may also be by-passed through the field reprogrammable gate array 34 to the PCI bus 38 without passing through the coprocessor 36. The signals on the PCI bus 38 pass through the main processor 66 and through a communications bus 129 to the communications network 76 in FIG. 1. As can be seen, the audio/video data flows through as many as five (5) different buses but only once through each bus. This allows for a streamlined flow of data through the intelligent imaging platform 18.

Figure 6:
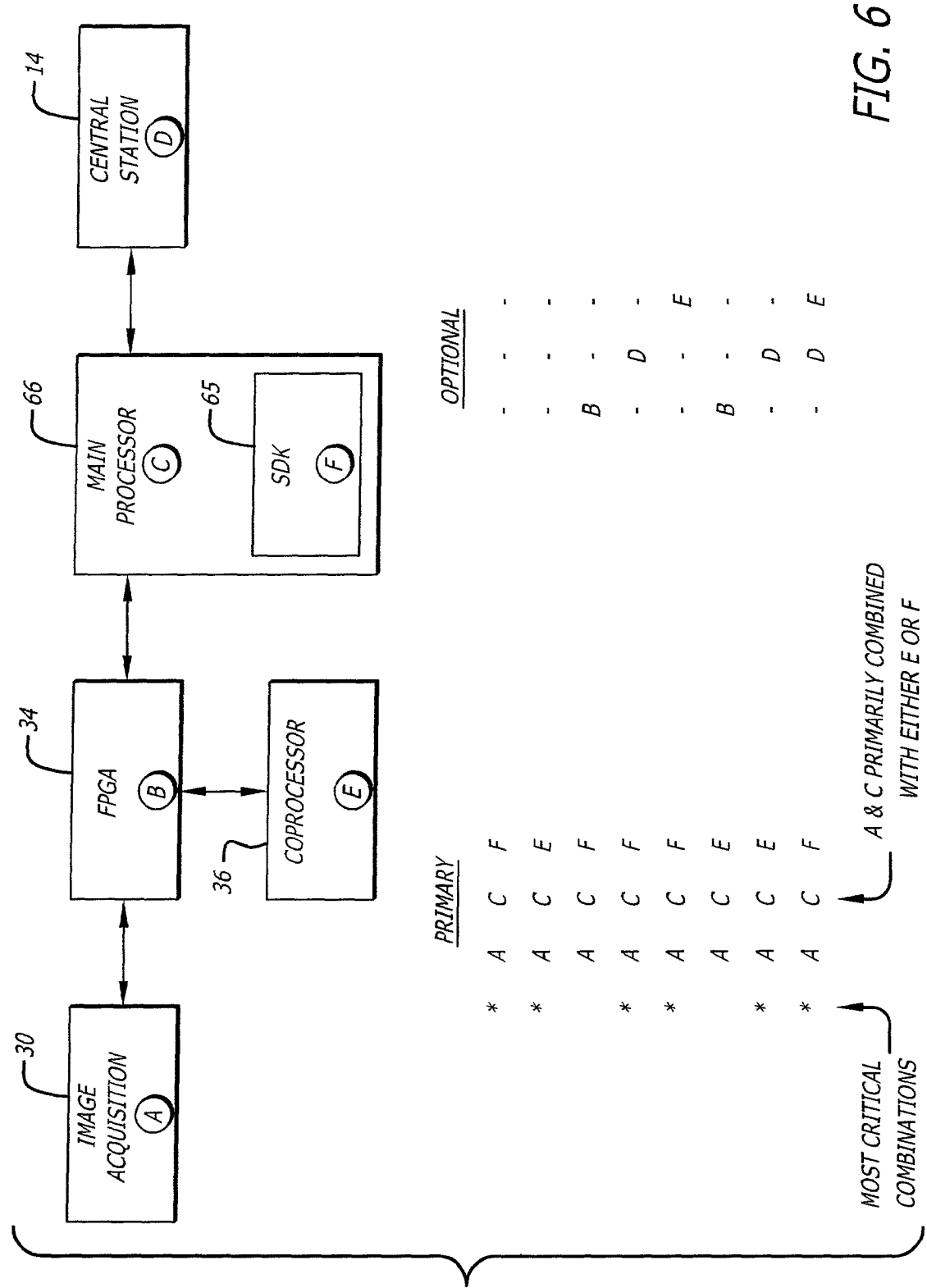
FIG. 6 is a schematic diagram showing how different primary blocks in the system shown in FIGS. 1-5 can be combined in different patentable combinations depending upon the results desired to be obtained from the processing of the acquired image and also including a chart showing different combinations of the blocks shown in FIG. 6.

FIG. 6 is a simplified block diagram of the system shown in the previous Figures. In this Figure, the stages discussed previously in connection with FIG. 1 and considered as primary are shown. The simplified system includes the image acquirer 30 (designated as A), the field programmable gate array 34 (designated as B), the main processor 66 (designated as C), the software development kit 65 (designated as F), the central station 14 (designated as D) and the coprocessor 36 (designated as E). The software development kit F may be considered as a part of the platform configuration 65 in FIGS. 1 and 2 and is included within the main processor 66.

Figure 4:
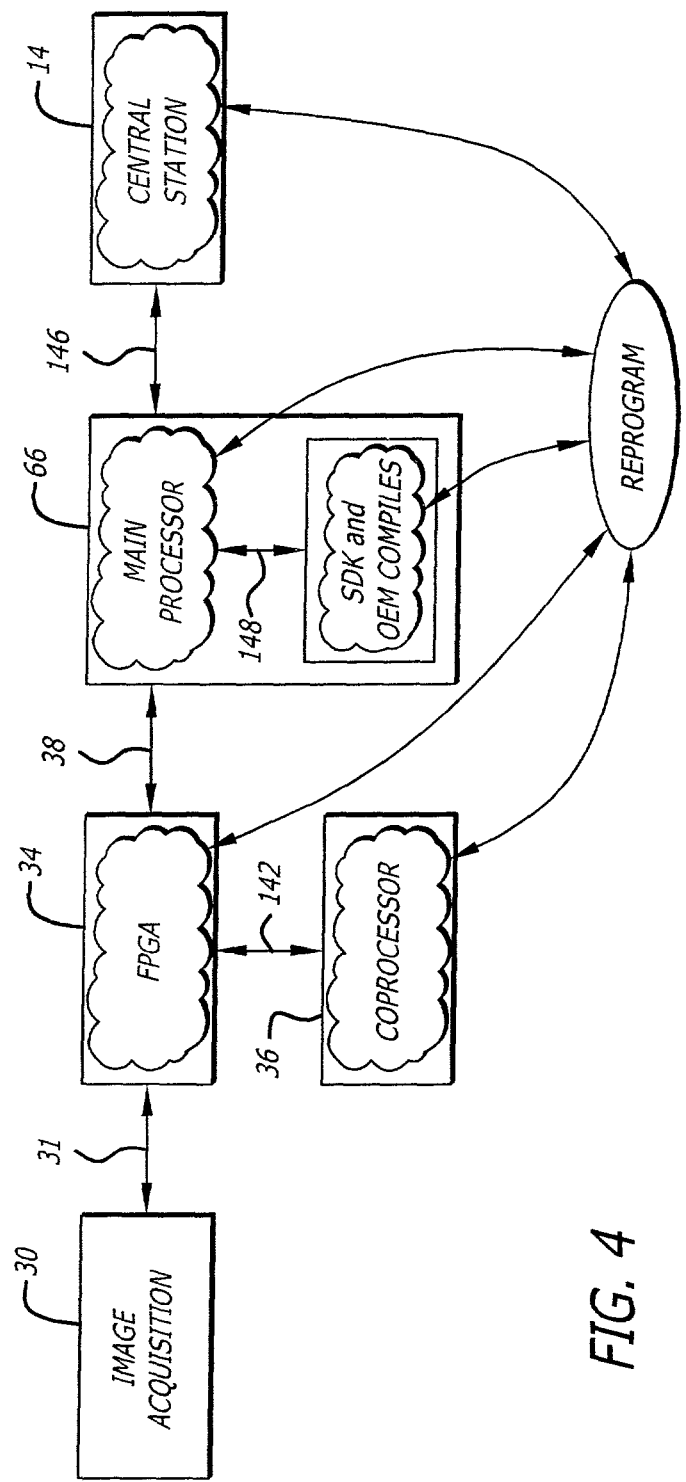
FIG. 4 is an expanded diagram, partially in block form, showing how different portions of the system shown in FIGS. 1-3 are reprogrammable, and how the different reprogrammable stages are connected to one another by interfaces.

FIG. 6 also includes a chart showing primary combinations of individual ones of the stages A-F in FIG. 6 and optional combinations of the primary stages with the other stages shown in FIG. 4. As will be seen, there are two (2) primary combinations—(1) a combination of A (the image acquirer), C (the main processor) and F (the software development kit) and (2) a combination of A (the image acquirer), C (the main processor) and E (the coprocessor). Certain optional combinations are also shown involving individual ones of B (the field reprogrammable gate array), D (the central station) and F (the software development kit) for the primary combination of A, C and E. They further include optional combinations of B (the field reprogramable gate array), D (the central station) and E (the coprocessor) for the primary combination of A, C and F. The combinations designated with a star in the first column may be considered as the most critical. It will be appreciated that the combinations shown in FIG. 6 are illustrative only and that a considerable number of other combinations (some even primary) may be provided without departing from the scope of the invention.

FIG. 4 illustrates the configurability of different ones of applicants' primary stages. The stages correspond to the primary stages shown in FIG. 6—namely, the image acquirer 30, the field programmable gate array 34, the coprocessor 36, the main processor 66, the software development kit 65 (within the main processor 66) and the central station 14. All of these stages (except for the image acquirer 30) are configurable or reprogrammable as indicated by a cloud like configuration within a rectangular block. Each cloud represents a configurable or reprogrammable entity which can be shaped to the task at hand. Each rectangular block represents the encompassing fixed body which is not unto itself configurable or reprogrammable.

The different blocks are defined and determined by the interfaces of applicants' assignee. These interfaces are as follows:
1. The video interface 31 between the image acquirer 30 and the field reprogrammable gate array 34;
2. A coprocessor interface 142 between the gate array 34 and the coprocessor 36;
3. The hardware interface 38 between the gate array 34 and the main processor 66;
4. A communications interface 146 between the main processor 66 and the central station 14; and
5. A software interface 148 between the main processor 66 and the software development kit 65.

The request to initiate reprogramming of a reprogrammable block can come from anywhere in the system with the exception of such stages as the image acquirer 30, the audio acquirer or codec 32 and the miscellaneous input/output stage 40. However, the reprogramming is provided by the main processor 66.

Figure 5:
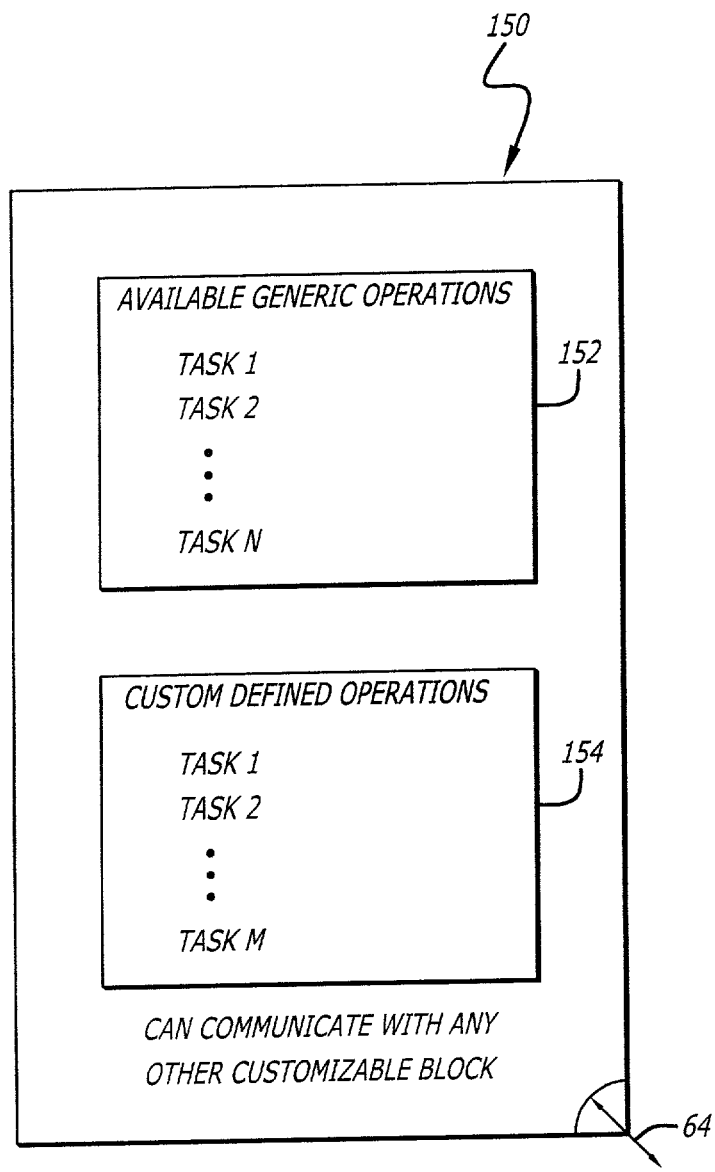
FIG. 5 is a schematic view showing the relationship between a reprogrammable stage and a non-reprogrammable stage, the reprogrammable stage being capable of providing a plurality of generic operations and a plurality of custom defined operations and the non-reprogrammable stage being capable of providing only a plurality of generic operations.

FIG. 5 schematically illustrates in some detail a customizable block, generally indicated at 150, which is also representative of other blocks. The customizable block 150 is reprogrammable as indicated by the diagonal arrow 64 in the lower right corner. The customizable block 150 includes a sub-block 152 capable of performing a plurality of available generic operations designated in the sub-block as tasks 1 to n. These operations are generic to the block 150 and other blocks. When the block 150 provides only available generic operations such as in the block 152, the block is not reprogrammable. The customizable block 150 may also include a sub-block 154 providing custom defined operations. These are operations individual to the block 150. The sub-block 154 may provide 1 to n custom operations. When the block 150 can provide one (1) or more custom defined operations, the block 150 is said to be reprogrammable and is demarcated or indicated by the arrow 64.

FIG. 7 is a chart showing examples of different functions capable of being performed by the system 10. It will be appreciated that FIG. 7 shows only a few of the multitudinous operations that can be performed by the system 10. The first (designated as "Main Function") column in FIG. 7 indicates four (4) different functions which can be performed by the system 10. These four (4) functions are:
(a) "Remote Color Video Monitor with Archive",
(b) "Face Print Generation and Upload to Server",
(c) "Gun Shot Detection and Server Notification," and
(d) "Subject Tracking with Realtime Video Monitor."

The second column in FIG. 7 is designated as "Other/Combined Functions". It indicates other functions which can be performed in addition to the "main function" specified in the first column. For example, another function or a sub-function such as "Audio Monitoring" can be performed in addition to the main function of "Remote Color Video Monitor with Archive." As another example, other functions or sub-functions such as (a) "Generate Face Present Audio Alert", (b) "Recognize Face and Alert Server of Match" and (c) "Recognize Multiple Faces Simultaneously" can be performed with the main function "Face Print Generation and Upload to Server".

The third column in FIG. 7 indicates the function that is performed in the preprocessor 92 in FIG. 2. For example, the preprocessor 92 performs a color correction when the main function is "Remote Color Video Monitor with Archive". As another example, the pre-processor 92 provides a "Facial Feature Extraction" when the main function is "Face Print Generation and Upload to Server". The operation of the third ($3^{rd}$) column in FIG. 7 is dependent on the operation of the first and second columns of FIG. 7. This is also true of the operation in the fourth ($4^{th}$) through eleventh ($11^{th}$) columns of FIG. 7.

FIG. 7 indicates the operation of the analyzer 94 in the fourth column of FIG. 7 for different ones of the main functions in column 1 of FIG. 7. For example, for the main function of "Face Print Generation and Upload to Server", the analyzer 94 operates to provide Face Print Generation. As another example, for the main function of "Subject Tracking with Realtime Video Monitor," the analyzer 94 operates to provide "Subject Detection/Motion Estimation."

Column 5 in FIG. 7 indicates the operation of the event generator 56 in FIGS. 1 and 2 for the different main functions in column 1 of FIG. 7. In like manner, column 6 in FIG. 7 indicates the operation of the event responder 58 in FIGS. 1 and 2 for the different main functions in column 1 of FIG. 7.

Similarly, column 7 in FIG. 7 indicates the operation of the storage member 96 in FIG. 2 for different main functions in column 1 of FIG. 7. The post processor 98 in FIG. 2 provides the operations shown in column 8 of FIG. 7 for the different main functions specified in column 1 of FIG. 7. The communication stages 70, 72 and 74 in FIG. 1 perform the operations shown in column 9 of FIG. 7 when the main function is as indicated in column 1 of FIG. 7 and the other combined functions are as indicated in column 2 of FIG. 7.

Column 10 of FIG. 7 indicates the miscellaneous output which is provided when the main function specified in column 1 of FIG. 7 is provided. The miscellaneous output is indicated at 40 in FIG. 1. The audio preprocessor 102 in FIG. 2 is shown in FIG. 2. The audio preprocessor 102 in FIG. 2 provides the operations shown in column 11 of FIG. 7 for the different main functions specified in column 1 of FIG. 7. In like manner, the audio analyzer 104 in FIG. 2 provides the operations shown in column 12 of FIG. 7 for the different main functions specified in column 1 of FIG. 7. The last column of FIG. 7 is designated as "Notes". This column indicates that the field programmable gate array 34 and the coprocessor 36 are utilized for added processing power when "Recognize Multiple Faces Simultaneously" is provided as a sub-function in column 2 of FIG. 7. As another example, the gate array 34 and the coprocessor 36 are utilized when "Multiple Subject Tracking is Provided with Digital Pan, Tilt, Zoom" is provided in column 2 of FIG. 7.

Although this invention has been disclosed and illustrated with reference to particular embodiments, the principle involved are susceptible for use in numerous other embodiments which will be apparent to persons of ordinary skill in the art. The invention is, therefore, to be limited only as indicated by the scope of the claims.

What is claimed is:

1. A method of processing an image, comprising the steps of:
   acquiring the image,
   processing the acquired image with a main processor,
   controlling the operation of the main processor in processing the image with one or more reprogrammable stages, at least one of the reprogrammable stages comprising a field reprogrammable gate array, and
   reprogramming the field reprogrammable gate array, the reprogramming being initiated by the main processor or by any one of the reprogrammable stages on the basis of a decision made by the main processor or by any one of the reprogrammable stages regarding the acquired image.

2. The method as set forth in claim 1, further comprising the steps of
   acquiring audio information relating to the image,
   controlling the operation of the main processor in processing the audio information, and
   reprogramming any one of the reprogrammable stages by the main processor or by any one of the reprogrammable stages on the basis of a decision made by the main processor or by any one of the reprogrammable stage regarding the audio information.

3. The method as set forth in claim 1 wherein
   the reprogramming of any one of the reprogrammable stages is provided by the main processor or by any one of the reprogrammable stages including the stage being reprogrammed.

4. The method as set forth in claim 2 wherein
   the reprogramming is provided by the main processor.

5. The method as set forth in claim 1 wherein
   the main processor and the reprogrammable stages are disposed in an intelligent imaging platform.

6. The method as set forth in claim 2 wherein
   the main processor and the reprogrammable stages are disposed in an intelligent imaging platform.

7. The method as set forth in claim 3 wherein
   the main processor and the reprogrammable stages are disposed in an intelligent imaging platform.

8. The method as set forth in claim 4 wherein
   the main processor and the reprogrammable stages are disposed in an intelligent imaging platform.

9. The method as set forth in claim 1, comprising the steps of:
   reprogramming the main processor by any one of the reprogrammable stages on the basis of a decision made by the reprogrammable stage regarding the acquired image.

10. A method of processing an image, comprising the steps of:
    acquiring the image,
    providing a main processor, constituting hardware, for processing the acquired image,
    providing reprogrammable software, including a software development kit, for prioritizing particular aspects of the acquired image before the acquired image is processed by the main processor, the software development kit being reprogrammable,
    providing for the reprogramming by any one of the main processor and the software including the software development kit, during the reprogramming of the software development kit, in accordance with the operation of the software development kit and the main processor,
    providing a field reprogrammable gate array to clarify the acquired image before the image is processed by the main processor, and
    providing for a reprogramming by any one of the main processor, the software development kit in the software and the field reprogrammable gate array of any one of the software development kit and the field reprogrammable gate array even while any one of the software development kit and the reprogrammable field gate array is being reprogrammed.

11. The method as set forth in claim 10, further comprising the steps of:
    providing an intelligent imaging platform,
    providing a reprogrammable central station for providing for at least one of the steps of setting up, programming and controlling the intelligent imaging platform to be enhanced by the reprogramming of the software development kit and the central station, even while any one of the software development kit and the central station is being reprogrammed, and
    providing for a reprogramming by any one of the central station, the main processor and the software development kit of any one of the software development kit and the central station, even while any one of the software development kit and the central station is being reprogrammed.

12. A method of processing an image, comprising the steps of:
    acquiring the image,
    providing a main processor, constituting hardware, for processing the acquired image,
    providing reprogrammable software, including a software development kit, for prioritizing particular aspects of the acquired image before the acquired image is processed by the main processor, the software development kit being reprogrammable, providing for the reprogramming by any one of the main processor and the software including the software development kit, during the reprogramming of the software development kit, in accordance with the operation of the software development kit and the main processor, wherein the reprogramming of the software development kit in the software is provided by the main processor and wherein the main processor and the software development kit in the software are disposed in an intelligent imaging platform.

13. A method of processing an image, comprising the steps of:

acquiring the image, providing a main processor, constituting hardware, for processing the acquired image, providing reprogrammable software, including a software development kit, for prioritizing particular aspects of the acquired image before the acquired image is processed by the main processor, the software development kit being reprogrammable, providing for the reprogramming by any one of the main processor and the software including the software development kit, during the reprogramming of the software development kit, in accordance with the operation of the software development kit and the main processor, providing a reprogrammable coprocessor to manipulate the acquired image before the acquired image is processed by the main processor, the manipulation depending upon the processing to be provided by the main processor, providing a reprogramming by any one of the main processor and the software, including the software development kit in the software and the coprocessor, of any one of the software development kit and the coprocessor even while any one of the software development kit and the coprocessor is being reprogrammed, wherein the reprogramming of the software development kit in the software and the coprocessor are provided by the main processor and wherein the main processor, the software development kit in the software and the coprocessor are disposed in an intelligent imaging platform.

14. A method of processing an image, comprising the steps of:

acquiring the image, providing a main processor, constituting hardware, for processing the acquired image, providing reprogrammable software, including a software development kit, for prioritizing particular aspects of the acquired image before the acquired image is processed by the main processor, the software development kit being reprogrammable, providing for the reprogramming by any one of the main processor and the software including the software development kit, during the reprogramming of the software development kit, in accordance with the operation of the software development kit and the main processor, providing an intelligent imaging platform, providing a reprogrammable central station for providing for at least one of the steps of setting up, programming and controlling the intelligent imaging platform to be enhanced by the reprogramming of the software development kit and the central station, even while any one of the software development kit and the central station is being reprogrammed, providing for a reprogramming by any one of the central station, the main processor and the software development kit of any one of the software development kit and the central station, even while any one of the software development kit and the central station is being reprogrammed, wherein the software development kit in the software and the main processor are disposed in the intelligent imaging platform and wherein the reprogramming of any one of the software development kit in the software and the central station is provided by the main processor in accordance with the operation of any one of the central station, the main processor and the software development kit, even while any one of the central station and the software development kit is being reprogrammed.

15. The method as set forth in claim 14 wherein audio information related to the video image is acquired and wherein a field reprogrammable gate array is provided to clarify the acquired audio information and wherein the reprogramming of the field reprogrammable gate array is made by any one of the main processor, the central station, and the software development kit in the software and the field reprogrammable gate array and wherein the reprogramming of the field reprogrammable gate array is provided by the main processor and wherein the field reprogrammable gate array is disposed in the intelligent imaging platform.

16. A method of processing an image, comprising the steps of:

acquiring the image, providing a main processor, constituting hardware, for processing the acquired image, providing reprogrammable software, including a software development kit, for prioritizing particular aspects of the acquired image before the acquired image is processed by the main processor, the software development kit being reprogrammable, providing for the reprogramming by any one of the main processor and the software including the software development kit, during the reprogramming of the software development kit, in accordance with the operation of the software development kit and the main processor, providing a reprogrammable coprocessor to manipulate the acquired image before the acquired image is processed by the main processor, the manipulation depending upon the processing to be provided by the main processor, providing a reprogramming by any one of the main processor and the software, including the software development kit in the software and the coprocessor, of any one of the software development kit and the coprocessor even while any one of the software development kit and the coprocessor is being reprogrammed, providing a field reprogrammable gate array to clarify the acquired image before the image is processed by the main processor, providing an intelligent imaging platform, providing a reprogrammable central station for performing at least one of the steps of setting up, programming and controlling the intelligent imaging platform, providing a reprogramming by any one of the field reprogrammable gate array, the central station, the main processor, the coprocessor and the software development kit of any one of the software development kit, the central station, the coprocessor and the field reprogrammable gate array and the software development kit, wherein the field reprogrammable gate array, the central station, the coprocessor and the software development kit are reprogrammable by any one of the main processor, the coprocessor, the central station, the software development kit and the field reprogrammable gate array and wherein the field reprogrammable gate array, the software development kit, the central station, the coprocessor and the main coprocessor are disposed in the intelligent imaging platform.

17. A method of processing an image, comprising the steps of:

acquiring the image, providing a main processor for processing the acquired image, providing software, including a software development kit for enabling a user to create software for prioritizing particular aspects of the acquired image before the acquired image is processed by the main processor, providing a field reprogrammable gate array to clarify the acquired image before the image is processed by the main processor, and providing a reprogramming by any one of the main processor, the software development kit and the field reprogrammable gate array of any one of the software created by the software development kit and the field reprogrammable gate array on the basis of a decision made by the main processor, the software or the field reprogrammable gate array regarding the acquired image.

18. The method as set forth in claim 17, further comprising the step of:

initiating a decision by any one of the main processor and the software created by the software development kit to have the software reprogrammed by the main processor on the basis of a decision made by the main processor or the software regarding the acquired image.

19. The method as set forth in claim 17, further comprising the steps of:

providing a coprocessor to manipulate the acquired image, dependent upon the processing to be provided by the main processor, the coprocessor being reprogrammable, and initiating a decision by any one of the main processor, the software created by the software development kit and the coprocessor to have any one of the software created by the software development kit and the coprocessor reprogrammed on the basis of a decision made by the main processor, the coprocessor or the software regarding the acquired image.

20. The method as set forth in claim 17, further comprising the steps of:

providing an intelligent imaging platform, providing a reprogrammable central station for providing for an enhancement of the operation of the intelligent imaging platform by the reprogramming of any one of the central station and the software created by the software development kit, and providing a reprogramming by any one of the main processor, the central station and the software created by the software development kit to obtain enhancement of the operation of any one of the central station and the software created by the software development kit on the basis of a decision made by the main processor, the software or the central station regarding the acquired image.

21. A method of processing an image, comprising the steps of:

acquiring the image, providing a main processor for processing the acquired image, providing software, including a software development kit for enabling a user to create software for prioritizing particular aspects of the acquired image before the acquired image is processed by the main processor, providing a field reprogrammable gate array to clarify the acquired image before the image is processed by the main processor, providing an intelligent imaging platform, providing a reprogrammable central station for an enhancement of the operation of the intelligent imaging platform by a reprogramming of any one of the software created by the software development kit and the field reprogrammable gate array, and initiating a decision by any one of the main processor, the software created by the software development kit, the central station and the field reprogrammable gate array to have any one of the central station, the software created by the software development kit and the field reprogrammable gate array, reprogrammed on the basis of a decision made by the main processor, the software created by the software development kit, the central station, or the field reprogrammable gate array regarding the acquired image.

22. A method of processing an image, comprising the steps of:

acquiring the image, providing a main processor for processing the acquired image, providing software, including a software development kit for enabling a user to create software for prioritizing particular aspects of the acquired image before the acquired image is processed by the main processor, initiating a decision by any one of the main processor and the software created by the software development kit to have the software reprogrammed by the main processor on the basis of a decision made by the main processor or the software regarding the acquired image, providing a reprogrammable coprocessor to manipulate the acquired image, dependent upon the processing to be provided by the main processor, before the acquired image is processed by the main processor, providing a field reprogrammable gate array to clarify the acquired image before the image is processed by the main processor, providing an intelligent imaging platform, providing a reprogrammable central station for providing for at least one of the steps of setting up, programming and controlling the intelligent imaging platform to be enhanced by reprogramming of any one of the central station, the field reprogrammable gate array, the software created by the software development kit and the coprocessor, and providing a reprogramming by any one of the central station, the main processor, the software created by the software development kit, the coprocessor and the field reprogrammable gate array of any one of the software created by the software development kit, the coprocessor, the central station and the field reprogrammable gate array, on the basis of a decision made by the central station, the main processor, the software created by the software development kit, the coprocessor or the field reprogrammable gate array regarding the acquired image.

23. A method of processing an image, comprising the steps of:
acquiring the image,
processing the acquired image with a main processor,
manipulating the acquired image with one or more reprogrammable stages before the acquired image is processed by the main processor, at least one of the reprogrammable stages, comprising a field reprogrammable gate array, and reprogramming the field reprogrammable gate array, the reprogramming being initiated by the main processor or by any of the reprogrammable stages dependent upon a decision made by the main processor or by any of the reprogrammable stages regarding the acquired image.

24. The method as set forth in claim 23, further comprising the step of:
providing a reprogrammable coprocessor in one of the reprogrammable stages and reprogramming the reprogrammable coprocessor during the reprogramming of the reprogrammable coprocessor.

25. The method as set forth in claim 23, further comprising the steps of:
providing an intelligent imaging platform,
providing a software development kit in the intelligent imaging platform for enabling a user to create software,
providing a reprogrammable central station for enhancing the operation of the intelligent imaging platform, and
reprogramming the central station or the software created by the software development kit on the basis of a decision made by the central station or the software development kit, regarding the acquired image.

26. The method as set forth in claim 23, further comprising the steps of:
providing a field reprogrammable gate array to clarify the acquired image before the acquired image is processed by the main processor,
providing an intelligent imaging platform,
providing a reprogrammable central station for providing enhancement of the intelligent imaging platform by reprogramming at least one of the field reprogrammable gate array, the central station and the reprogrammable stages, and
reprogramming any of the main processor, the central station, the reprogrammable stages or the field reprogrammable gate array by any of the central station, the field reprogrammable gate array or the reprogrammable stages on the basis of a decision made by the main processor, the central station, the field programmable gate array or the reprogrammable stages regarding the acquired image.

27. The method as set forth in claim 23, further comprising the steps of:
controlling the operation of the main processor with one or more reprogrammable stages,
reprogramming any of the reprogrammable stages by the main processor or by any of the reprogrammable stages dependent upon a decision made by the main processor or the reprogrammable stages regarding the acquired image.

28. The method as set for the in claim 27, further comprising the steps of:
reprogramming the main processor by any of the reprogrammable stages dependent upon a decision made by the reprogrammable stage regarding the acquired image.

29. A method of processing an image, comprising the steps of:
acquiring the image,
processing the acquired image with a main processor,
manipulating the acquired image with one or more reprogrammable stages before the acquired image is processed by the main processor,
reprogramming the reprogrammable stages, the reprogramming being initiated by the main processor or by any of the reprogrammable stages dependent upon a decision made by the main processor or by any of the reprogrammable stages regarding the acquired image,
providing a field reprogrammable gate array to clarify the acquired image before the acquired image is processed by the main processor, and
reprogramming the field reprogrammable gate array by the main processor or by any of the reprogrammable stages on the basis of a decision made by the main processor or by any one of the reprogrammable stages regarding the acquired image.

30. A method of processing an image, comprising the steps of:
acquiring the image,
processing the acquired image with a main processor,
manipulating the acquired image with one or more reprogrammable stages before the acquired image is processed by the main processor,
reprogramming the reprogrammable stages, the reprogramming being initiated by the main processor or by any of the reprogrammable stages dependent upon a decision made by the main processor or by any of the reprogrammable stages regarding the acquired image,
providing a field reprogrammable gate array to clarify the acquired image before the image is to be processed by the main processor,
providing an intelligent imaging platform,
providing a reprogrammable central station for providing for at least one of the steps of setting up, programming and controlling the intelligent imaging platform to be enhanced by reprogramming any of the central station, the field reprogrammable gate array or the reprogrammable stages,
providing a software development kit for enabling a user to create software, and
reprogramming any of the main processor, the software created by the software development kit, the reprogrammable stages, the central station or the field reprogrammable gate array by any of the central station, the reprogrammable stages, the software created by the software development kit or the field reprogrammable gate array on the basis of a decision made by the central station, the reprogrammable stages, the software created by the software development kit or the field reprogrammable gate array regarding the acquired image.

31. The method as set forth in claim 30, further comprising the steps of
reprogramming of any of the reprogrammable stages, the software created by the software development kit, the central station or the field reprogrammable gate array by the main processor, and disposing the main processor, the software created by the software development kit, the reprogrammable stages and the field reprogrammable gate array in the intelligent imaging platform.

32. A method of processing an image, comprising the steps of:

acquiring the image, providing software to concentrate on certain aspects of the image, the software being reprogrammable, providing hardware to process the concentrated aspects of the image, providing for the reprogramming of the software by any one of the hardware and the software to concentrate on the certain aspects of the image during the reprogramming of the software by any one of the software and the hardware, providing a reprogrammable coprocessor for manipulating the acquired image to facilitate the processing by the main hardware of the concentrated aspects of the acquired image, providing an intelligent imaging platform, providing a field reprogrammable gate array for clarifying the acquired image from the image acquirer before the image is processed by the hardware, providing a reprogrammable central station responsive to the processing from the hardware for facilitating the operation of the intelligent imaging platform by reprogramming any one of the software, the central station, the coprocessor and the field reprogrammable gate array, and providing for the reprogramming of any one of the software, the coprocessor, the central station and the field reprogrammable gate array by any one of the hardware, the software, the coprocessor, the central station and the field reprogrammable gate array.

33. The method as set forth in claim 32, wherein the software, the hardware, the coprocessor and the field reprogrammable gate array are disposed in the intelligent imaging platform, and including:

providing for a reprogramming of the software and the coprocessor and the field reprogrammable gate array, even while any one of the software and the field reprogrammable gate array is being reprogrammed.

34. The method as set forth in claim 32 wherein the hardware and the software are disposed in an intelligent imaging platform, and wherein the software is reprogrammed during the reprogramming of the software.

35. A method of processing an image, comprising the steps of:

acquiring the image, processing the acquired image with a main processor, providing a software development kit for enabling a user to create software for prioritizing particular aspects of the acquired image, the software created by the software development kit being reprogrammable, and reprogramming the software created by the software development kit on the basis of a decision made by the main processor regarding the acquired image.

36. The method as set forth in claim 35, further comprising the steps of:

providing an intelligent imaging platform, providing software including a reprogrammable central station to enhance the operation of the intelligent imaging platform by reprogramming any one of the software created by the software development kit and the central station during the reprogramming of any one of the central station and the software created by the software development kit.

37. The method as set forth in claim 35, further comprising the steps of:

providing an intelligent imaging platform, providing software including a reprogrammable central station to enhance the operation of the intelligent imaging platform by reprogramming any one of the software created by the software development kit and the central station during the reprogramming of any one of the central station and the software created by the software development kit, manipulating the acquired image with a reprogrammable coprocessor, before the acquired image is processed by the main processor, and reprogramming any one of the main processor, the central station, the software created by the software development kit and the coprocessor on the basis of a decision made by any one of the software created by the software development kit, the coprocessor, and the central station regarding the acquired image.

38. The method as set forth in claim 35, further comprising the steps of:

providing an intelligent imaging platform, providing software including a reprogrammable central station to enhance the operation of the intelligent imaging platform by reprogramming any one of the software created by the software development kit and the central station during the reprogramming of any one of the central station and the software created by the software development kit, clarifying the acquired image with a field reprogrammable gate array before the image is processed by the main processor, and reprogramming any one of the main processor, the central station, the software created by the software development kit and the reprogrammable field gate array on the basis of a decision made by any one of the software created by the software development kit, the reprogrammable field gate array and the central station, during the reprogramming of any one of the software created by the software development kit, the central station and the reprogrammable field gate array.

39. The method as set forth in claim 35, further comprising the steps of:

acquiring audio information related to the acquired image, manipulating the audio information with a reprogrammable audio manipulator, and reprogramming the audio manipulator, the reprogramming being initiated by any one of the main processor and the audio manipulator on the basis of a decision made by the main processor regarding the audio information.

40. The method as set forth in claim 39, further comprising the steps of:

disposing the main processor, the software created by the software development kit and the audio manipulator in an intelligent imaging platform to facilitate the operation of the intelligent imaging platform.

41. The method as set forth in claim 35, further comprising the steps of:

manipulating the acquired image with a reprogrammable coprocessor, before the acquired image is processed by the main processor, clarifying the acquired image with a field reprogrammable gate array before the acquired image is processed by the main processor, and reprogramming any one of the software created by the software development kit, the main processor, the coprocessor and the field reprogrammable gate array on the basis of a decision made by any one of the software created by the software development kit, the coprocessor and the field reprogrammable gate array regarding the acquired image.

42. A method of processing an image, comprising the steps of:
    acquiring the image,
    manipulating the acquired image with one or more reprogrammable stages, at least one of the reprogrammable stages comprising a field reprogrammable gate array,
    processing the manipulated image from the reprogrammable stages with a main processor, and
    reprogramming the field reprogrammable gate array, the reprogramming being initiated by the main processor or the reprogrammable stages to enhance the manipulation of the acquired image by the reprogrammable stages on the basis of a decision made by the main processor or the reprogrammable stages regarding the acquired image.

43. The method as set forth in claim 42, wherein:
    the main processor and the reprogrammable stages are disposed in an intelligent imaging platform.

44. A method of processing an image, comprising the steps of:
    acquiring the image,
    manipulating the acquired image with software including a reprogrammable coprocessor,
    processing the manipulated image from the coprocessor with a main processor,
    reprogramming any one of the main processor and the reprogrammable coprocessor to enhance the manipulation of the acquired image by the reprogrammable coprocessor,
    utilizing a software development kit provided in the software to create software for prioritizing particular aspects of the acquired image before the acquired image is processed by the main processor, and
    reprogramming any one of the reprogrammable coprocessor, the software created by the software development kit and the main processor by any one of the software created by the software development kit and the reprogrammable coprocessor on the basis of a decision made by the reprogrammable coprocessor, the software created by the software development kit or the main processor regarding the acquired image for facilitating the processing of the image by the main processor.

45. The method as set forth in claim 44, further comprising the steps of:
    clarifying the acquired image with a field reprogrammable gate array before the image is processed by the main processor, and
    reprogramming the reprogrammable coprocessor or the field reprogrammable gate array by any of the reprogrammable coprocessor, the field reprogrammable gate array or the main processor for facilitating the processing of the image by the main processor on the basis of a decision made by the reprogrammable coprocessor, the field reprogrammable gate array or the main processor regarding the acquired image.

46. The method as set forth in claim 44, further comprising the steps of:
    clarifying the acquired image with a field reprogrammable gate array before the image is processed by the main processor, and
    reprogramming any one of the coprocessor, the software created by the software development kit, and the field reprogrammable gate array, by any one of the main processor, the coprocessor, and the field reprogrammable gate array and the software created by the software development kit for facilitating the processing of the image by the main processor.

47. An apparatus for processing an image to obtain desired results, comprising:
    an image acquirer for acquiring the image and for converting the acquired image to signals representing the image,
    software responsive to the signals from the image acquirer and reprogrammable in accordance with the processing desired of the image for providing signals concentrating on certain aspects of the image,
    hardware responsive to the signals from the software for reprogramming the software, the reprogramming being initiated by the hardware or the software on the basis of a decision made by the hardware or the software regarding the acquired image, and
    a field reprogrammable gate array for manipulating the signals from the image acquirer for introduction to the software to obtain a clarification of the signals introduced to the software.

48. The apparatus as set forth in claim 47, further comprising
    an intelligent imaging platform, and
    a central station responsive to the signals from the hardware and reprogrammable by the hardware or the software on the basis of a decision made by the hardware or software regarding the acquired image for enhancing the operation of the hardware in controlling the operation of the intelligent imaging platform.

49. An apparatus for processing an image to obtain desired results, comprising:
    an image acquirer for acquiring the image and for converting the acquired image to signals representing the image,
    software responsive to the signals from the image acquirer and reprogrammable in accordance with the processing desired of the image for providing signals concentrating on certain aspects of the image,
    hardware responsive to the signals from the software for reprogramming the software to provide the concentrated signals,
    a coprocessor reprogrammable by any one of the hardware, the software and the coprocessor on the basis of a decision made by the hardware, the software or the coprocessor regarding the acquired image for manipulating the signals acquired from the image in accordance with the results desired to be obtained from the acquired image,
    an intelligent imaging platform, and
    a reprogrammable central station included in the software and connected to the hardware for cooperation with the hardware in becoming reprogrammed to enhance the operation of the hardware in providing the steps of reprogramming and controlling the operation of the intelligent imaging platform.

50. An apparatus for processing an image to obtain desired results, comprising:
    an image acquirer for acquiring the image and for converting the acquired image to signals representing the image,
    software responsive to the signals from the image acquirer and reprogrammable in accordance with the processing desired of the image for providing signals concentrating on certain aspects of the image, hardware responsive to the signals from the software for reprogramming the software to provide the concentrated signals, a field reprogrammable gate array for reprogramming the signals from the image acquirer for introduction to the software to obtain a clarification of the signals introduced to the software, an intelligent imaging platform, a reprogrammable central station included in the software and connected to the hardware for cooperation with the hardware in becoming reprogrammed to enhance the operation of the hardware in providing the steps of reprogramming and controlling the operation of the intelligent imaging platform, a reprogrammable coprocessor included for manipulating the signals acquired from the image in accordance with the results desired to be obtained from the acquired image, and a software development kit included in the software for enabling a user to create software and reprogrammable to prioritize the signals in the software, any one of the software, the field reprogrammable gate array, the coprocessor and the software created by the software development kit being reprogrammable, the reprogramming being initiated by any one of the software, the hardware, the field reprogrammable gate array, the software created by the software development kit and the coprocessor on the basis of a decision made by the software, the field reprogrammable gate array, the coprocessor or the software created by the software development kit regarding the acquired image.

51. An apparatus for processing an image, comprising:

an image acquirer for acquiring the image and for converting the acquired image to signals representing the acquired image, software including a coprocessor reprogrammable for manipulating the signals acquired from the image acquirer in accordance with the results desired to be obtained, and a main processor for processing the manipulated signals from the reprogrammable coprocessor and for reprogramming the coprocessor on the basis of a decision made by the main processor or the software regarding the acquired image, the coprocessor being reprogrammable for prioritizing the manipulated signals, and a field reprogrammable gate array to reprogram the image acquirer for introduction to the software to prioritize the signals in the software.

52. The apparatus as set forth in claim 51, further comprising:

a reprogrammable intelligent imaging platform operable in the software by the main processor, and a central station connected in the software to the main processor and reprogrammable to enhance the operation of the main processor in setting up, programming and controlling the operation of the intelligent imaging platform.

53. The apparatus as set forth in claim 51, further comprising:

the reprogramming of the field reprogrammable gate array and the reprogrammable coprocessor being provided by any of the field reprogrammable gate array, the reprogrammable coprocessor and the main processor on the basis of a decision made by the field reprogrammable gate array, the reprogrammable coprocessor or the main processor regarding the acquired image so as to facilitate the processing of the image by the main processor.

54. The apparatus as set forth in claim 53, further comprising:

a reprogrammable video manipulator, a reprogrammable event generator and a reprogrammable event responder included in the software and the reprogramming of the video manipulator, the event generator and the event responder being initiated by any of the gate array, the coprocessor, the main processor, the video manipulator, the event generator or the event responder in accordance with the results desired to be obtained by the operation of the main processor.

55. An apparatus for processing an image of an event to provide a desired result, comprising:

an intelligent imaging platform, one or more reprogrammable stages responsive to particular characteristics of the event, a main processor included in the intelligent imaging platform for providing a controlled operation of the intelligent imaging platform in processing the image in accordance with information provided by the reprogrammable stages, each of the reprogrammable stages being included in the intelligent imaging platform, and being reprogrammable, at least one of the reprogrammable stages comprising a field reprogrammable gate array, the reprogramming of the field reprogrammable gate array being initiated by any one of the reprogrammable stages or by the main processor on the basis of a decision made by any one of the reprogrammable stages or the main processor regarding the characteristics of the event.

56. The apparatus as set forth in claim 55, wherein the reprogrammable stages comprise:

a reprogrammable analyzer for analyzing the image to identify particular characteristics of the image.

57. The apparatus as set forth in claim 56, wherein the reprogrammable stages further comprise:

a reprogrammable post-processor for modifying the signals representing the image from the analyzer for introducing the modified signals to the main processor to facilitate the processing of the acquired image by the main processor.

58. The apparatus as set forth in claim 57, further comprising:

an intelligent imaging platform responsive to the operation of the main processor for providing the desired signals.

59. The apparatus as set forth in claim 57, wherein:

the post-processor is reprogrammable by any of the reprogrammable stages.

60. The apparatus as set forth in claim 56, wherein the reprogrammable stages further comprise:

a reprogrammable preprocessor for adjusting the image to concentrate upon the particular characteristics of the image before the image is analyzed.

61. The apparatus as set forth in claim 56, wherein the reprogrammable stages further comprise:

a reprogrammable event generator for making event decisions with respect to the particular characteristics of the image upon the identification of the particular characteristics of the image.

62. The apparatus as set forth in claim 61, wherein the reprogrammable stages further comprise:

a reprogrammable event responder for providing action with respect to the particular characteristics of the image in accordance with the decisions made by the event responder, the main processor providing a controlled operation of the intelligent imaging platform in accordance with the responses provided by the event responder.

63. The apparatus as set forth in claim 62, wherein:
the analyzer, the event generator and the event responder are reprogrammable during the reprogramming of any of the analyzer, the event generator and the event responder, to adjust the individual characteristics of the image provided by the intelligent imaging platform.

64. The apparatus as set forth in claim 62, wherein each of the analyzer, the event generator and the event responder is reprogrammable by any of the analyzer, the event generator, the event responder and the main processor to provide for an adjustment in the operation of any of the analyzer, the event generator and the event responder.

65. An apparatus for processing an image, comprising:
an image acquirer for acquiring the image and for converting the acquired image to signals representing the image,
a reprogrammable event generator responsive to the signals from the image acquirer for prioritizing individual ones of the signals in accordance with the results desired to be obtained in the processed image,
a reprogrammable event responder responsive to the prioritized signals from the event generator for making decisions based upon the prioritized signals from the event generator and upon the desired results and for providing signals representing these decisions, and
a processor for processing the signals representing the decisions from the event responder to obtain the desired results,
each of the event generator and the event responder being reprogrammable, the reprogramming being initiated by the event generator, the event responder or the processor on the basis of a decision made by any one of the event generator, the event responder, or the processor, regarding the acquired image.

66. The apparatus set forth in claim 65, further comprising:
each of the event generator and the event responder being reprogrammable by any of the event generator, the event responder, or the processor in accordance with the results desired to be obtained in the acquired image,
each of the event generator and the event responder being reprogrammable during the reprogramming of any one of the event generator and the event responder.

67. The apparatus as set forth in claim 65, further comprising:
an audio acquirer for acquiring audio information related to the image and for converting the audio information to signals representing the audio information, and
an audio manipulator responsive to the audio signals for modifying the audio signals to clarify the audio information represented by the signals,
the audio manipulator being reprogrammable by the audio manipulator or by the processor in accordance with the results desired to be obtained in the acquired image.

68. An apparatus for processing an image, comprising:
an image acquirer for acquiring the image and for converting the acquired image to signals representing the image,
a reprogrammable event generator responsive to the signals from the image acquirer for prioritizing individual ones of the signals in accordance with the results desired to be obtained in the processed image,
a reprogrammable event responder responsive to the prioritized signals from the event generator for making decisions based upon the prioritized signals from the event generator and upon the desired results and for providing signals representing these decisions,
a processor for processing the signals representing the decisions from the event responder to obtain the desired results,
each of the event generator and the event responder being reprogrammable, the reprogramming being initiated by the event generator, the event responder or the processor on the basis of a decision made by any one of the event generator, the event responder, or the processor, regarding the acquired image,
a video manipulator responsive to the signals from the image acquirer for modifying the signals representing the acquired image to clarify the image represented by the signals and for introducing the modified signals to the event generator,
the video manipulator being reprogrammable by any of the event generator, the event responder, the processor, or the video manipulator in accordance with the results desired to be obtained in the acquired image.

69. The apparatus as set forth in claim 68, further comprising:
an intelligent imaging platform,
the image acquirer, the event generator, the event responder, the processor and the video manipulator being disposed in the intelligent imaging platform.

70. An apparatus for processing an image, comprising:
an image acquirer for acquiring the image and for converting the acquired image to signals representing the image,
a reprogrammable event generator responsive to the signals from the image acquirer for prioritizing individual ones of the signals in accordance with the results desired to be obtained in the processed image,
a reprogrammable event responder responsive to the prioritized signals from the event generator for making decisions based upon the prioritized signals from the event generator and upon the desired results and for providing signals representing these decisions,
a processor for processing the signals representing the decisions from the event responder to obtain the desired results,
each of the event generator and the event responder being reprogrammable, the reprogramming being initiated by the event generator, the event responder or the processor on the basis of a decision made by any one of the event generator, the event responder, or the processor, regarding the acquired image,
an intelligent imaging platform,
the image acquirer, the event generator, the event responder, the processor, the audio acquirer and the audio manipulator being disposed in the intelligent imaging platform,
each of the video manipulator, the event generator and the event responder being reprogrammable by any of the video manipulator, the event generator, the event responder or the processor.

71. An apparatus for processing an image, comprising:
an image acquirer for acquiring the image,
a main processor for processing the acquired image,
one or more reprogrammable stages, and
a software development kit for enabling a user to create software to control the operation of the main processor and the reprogrammable stages,
the image acquirer, the main processor, the reprogrammable stages, and the software development kit being interconnected to provide for the reprogramming of any one of the reprogrammable stages on the basis of a decision made by the software created with the software development kit regarding the acquired image.

72. The apparatus as set forth in claim 71, further comprising:
a coprocessor connected in the system to prioritize particular characteristics of the acquired image before the introduction of the acquired image to the main processor,
the coprocessor being reprogrammable by any of the main processor, the coprocessor or software created with the software development kit on the basis of a decision made by the main processor, the coprocessor or the software created with the software development kit regarding the acquired image.

73. The apparatus as set forth in claim 71, further comprising:
a reprogrammable intelligent imaging platform, and
a reprogrammable central station connected to the main processor for providing set up, programming and control of the main processor in controlling the operation of the intelligent imaging platform,
each of the software development kit and the central station being reprogrammable by any of the software created with the software development kit, the central station or the main processor on the basis of a decision made by the software created with the software development kit, the central station or the main processor regarding the acquired image.

74. An apparatus for processing an image, comprising:
an image acquirer for acquiring the image,
a main processor for processing the acquired image,
one or more reprogrammable stages,
a software development kit for enabling a user to create software to control the operation of the main processor and the reprogrammable stages,
the image acquirer, the main processor, the reprogrammable stages, and the software development kit being interconnected in the system to provide for the reprogramming of any one of the reprogrammable stages on the basis of a decision made by the software created with the software development kit regarding the acquired image,
a field reprogrammable gate array to clarify particular aspects of the acquired image before the introduction of the acquired image to the main processor,
the gate array being reprogrammable by the main processor, the software created with the software development kit or the gate array on the basis of a decision made by the main processor, the software created with the software development kit or the gate array regarding the acquired image.

75. An apparatus for processing an image, comprising:
an image acquirer for acquiring the image,
a main processor for processing the acquired image,
one or more reprogrammable stages,
a software development kit for enabling a user to create software to control the operation of the main processor and the reprogrammable stages,
the image acquirer, the main processor, the reprogrammable stages, and the software development kit being interconnected in the system to provide for the reprogramming of any one of the reprogrammable stages on the basis of a decision made by the software created with the software development kit regarding the acquired image,
a coprocessor connected in the system to prioritize particular characteristics of the acquired image before the introduction of the acquired image to the main processor,
the coprocessor being reprogrammable by any of the main processor, the coprocessor or the software created with the software development kit on the basis of a decision made by the main processor, the coprocessor or the software created with the software development kit regarding the acquired image,
a field reprogrammable gate array to clarify the acquired image before the introduction of the acquired image to the main processor,
an intelligent imaging platform including the main processor, the software created with the software development kit, the gate array and the coprocessor, and
a central station included in the intelligent imaging platform for providing for the set up, programming and control of the main processor in accordance with the prioritized aspects of the acquired image.

76. An apparatus for processing an image, comprising:
an image acquirer for acquiring the image,
a coprocessor connected in the system to prioritize particular characteristics of the acquired image,
a software development kit for enabling a user to create software for emphasizing individual ones of the particular prioritized characteristics of the acquired image,
a main processor for processing the image in accordance with the operation of the coprocessor and the software created by the software development kit,
each of the coprocessor and the software created by the software development kit being reprogrammable, and
the main processor, the coprocessor and the software created by the software development kit initiating a reprogramming of any one of the coprocessor and the software created by the software development kit on the basis of a decision made by the main processor, the coprocessor or the software created by the software development kit regarding the acquired image.

77. The apparatus as set forth in claim 76, further comprising:
a field reprogrammable gate array for clarifying particular aspects of the acquired image before the introduction of the acquired image to the coprocessor,
the reprogramming of the gate array being provided by any of the coprocessor, the software created by the software development kit, the gate array or the main processor on the basis of a decision made by the gate array, the coprocessor, the software created by the software development kit or the main processor regarding the acquired image.

78. The apparatus as set forth in claim 76, wherein:
the main processor is operative to reprogram the software created by the software development kit or the coprocessor.

79. The apparatus as set forth in claim 76, further comprising:
an intelligent imaging platform,
the image acquirer, the coprocessor, the software development kit and the main processor being disposed in the intelligent imaging platform.

80. The apparatus as set forth in claim 79, further comprising:
a reprogrammable central station for providing information to the main processor to affect the operation of the main processor in operating the intelligent imaging platform, the central station being operative to initiate the reprogramming of any of the software created by the software development kit, the coprocessor or the central station on the basis of a decision made by the software created by the software development kit, the coprocessor or the central station regarding the acquired image.

81. An apparatus for processing an image, comprising:
an acquirer for acquiring the image,
a main processor for processing the acquired image,
a software development kit associated with the main processor for enabling a user to create software for indicating to the main processor how the acquired image should be processed,
the main processor and the software development kit being interconnected to initiate a reprogramming of the software created by the software development kit on the basis of a decision made by any one of the main processor and the software created by the software development kit regarding the acquired image.

82. The apparatus as set forth in claim 81, further comprising:
an acquirer for acquiring audio information related to the image, and
an audio manipulator for clarifying the acquired audio information,
the audio manipulator being reprogrammable by the main processor or by the audio manipulator on the basis of a decision made by any of the main processor, the software created by the software development kit or the audio manipulator regarding the acquired audio information.

83. The apparatus as set forth in claim 81, wherein:
the main processor is responsive to the reprogramming of the software created by the software development kit to reprogram the software created by the software development kit.

84. The apparatus as set forth in claim 83, further comprising:
a reprogrammable coprocessor responsive to the acquired image from the acquirer for emphasizing particular aspects of the acquired image before passing the acquired image to the main processor to be processed by the main processor,
the reprogramming of the software created by the software development kit or the coprocessor being provided by any of the main processor, the software created by the software development kit or the coprocessor on the basis of a decision made by the main processor, the software created by the software development kit or the coprocessor regarding the acquired image.

85. The apparatus as set forth in claim 83, further comprising:
a field reprogrammable gate array to clarify the acquired image before passing the acquired image to the main processor,
the reprogramming of the software created by the software development kit and the field reprogrammable gate array being provided by the main processor, the software created by the software development kit or the field reprogrammable gate array on the basis of a decision made by the main program, the software created by the software development kit, or the field reprogrammable gate array regarding the acquired image.

86. The apparatus as set forth in claim 83, further comprising:
a field reprogrammable gate array to clarify the acquired image before passing the acquired image to the main processor,
the reprogramming of the software created by the software development kit and the field reprogrammable gate array being provided by any of the main processor, the software created by the software development kit or the field reprogrammable gate array on the basis of a decision made by the main processor, the software created by the software development kit or the field reprogrammable gate array regarding the acquired image,
an acquirer for acquiring audio information related to the image, and
an audio manipulator for clarifying the acquired audio information,
the audio manipulator being reprogrammable by the main processor, the software created by the software development kit, the field reprogrammable gate array or the audio manipulator on the basis of a decision made by the main processor, the software created by the software development kit, the field reprogrammable gate array or the audio manipulator regarding the acquired audio information.

87. An apparatus for processing an image, comprising:
an acquirer for acquiring the image,
a main processor for processing the acquired image,
a coprocessor for manipulating the acquired image before the introduction of the acquired image to the main processor,
the coprocessor being reprogrammable,
the reprogramming of the coprocessor being initiated by the main processor or the coprocessor on the basis of a decision made by any one of the main processor and the coprocessor regarding the acquired image,
a gate array reprogrammable to clarify the acquired image before passing the acquired image to the main processor,
the reprogramming of the coprocessor and the reprogrammable gate array being provided by any of the main processor, the coprocessor or the reprogrammable gate array on the basis of a decision made by the main processor, the coprocessor or the reprogrammable gate array regarding the acquired image.

88. The apparatus as set forth in claim 87, comprising:
any one of the main processor and the coprocessor being responsive to the reprogramming of the coprocessor for reprogramming the coprocessor.

89. The apparatus as set forth in claim 87, wherein:
any one of the main processor, the gate array and the coprocessor are responsive to the reprogramming of any one of the coprocessor and the gate array for reprogramming any one of the gate array and the coprocessor.

90. A method of processing an image in an intelligent imaging platform, comprising the steps of:
acquiring information concerning the image for introduction to the intelligent imaging platform,
processing the information with a main processor in the intelligent imaging platform,
said intelligent imaging platform including a plurality of reprogrammable stages for reprogramming the operation of the intelligent imaging platform in processing the information,
reprogramming any of the reprogrammable stages, the reprogramming being initiated by the main processor or by any one of the reprogrammable stages on the basis of a decision made by the main processor or by any one of the reprogrammable stages regarding the acquired information, to control the operation of the intelligent imaging platform in processing an image,
providing a reprogrammable field gate array to clarify the acquired image before the image is processed by the main processor, and
reprogramming any of the reprogrammable stages, including the reprogrammable field gate array, by the main processor or by any of the reprogrammable stages to operate the main processor in processing the image.

91. A method of processing an image in an intelligent imaging platform, comprising the steps of:

acquiring information concerning the image for introduction to the intelligent imaging platform, processing the information with a main processor in the intelligent imaging platform, said intelligent imaging platform including a plurality of reprogrammable stages for reprogramming the operation of the intelligent imaging platform in processing the information, at least one of the reprogrammable stages comprising a field reprogrammable gate array, and reprogramming the field reprogrammable gate array, the reprogramming being initiated by the main processor or by any one of the reprogrammable stages on the basis of a decision made by the main processor or by any one of the reprogrammable stages regarding the acquired information, to control the operation of the intelligent imaging platform in proving an image.

92. The method as set forth in claim 91, further comprising the steps of:

acquiring audio information relating to the image for introduction to the intelligent imaging platform, providing at least one reprogrammable audio stage for manipulating the operation of the main processor in processing the audio information, and reprogramming the at least one audio stage by the main processor or by the reprogrammable audio stage on the basis of a decision made by the main processor or the reprogrammable audio stage regarding the acquired audio information.

93. The method as set forth in claim 91, wherein:

the reprogramming of the reprogrammable stages is provided by the main processor.

94. The method as set forth in claim 91, further comprising the steps of:

providing a software development kit as one of the reprogrammable stages for enabling a user to create software for prioritizing certain aspects of the acquired image before the acquired image is processed by the main processor, and reprogramming of any of the reprogrammable stages, including the software created by the software development kit, by the main processor or by any of the reprogrammable stages to obtain the operation of the main processor in processing the image.

95. The method as set forth in claim 91, further comprising the steps of:

providing a reprogrammable coprocessor to manipulate the image before the image is processed by the main processor, the manipulation being dependent upon the processing to be provided by the main processor, and reprogramming any of the reprogrammable stages, including the reprogrammable coprocessor, by the main processor or by any of the reprogrammable stages to obtain the operation of the main processor in processing the image.

96. The method as set forth in claim 91, further comprising the steps of:

providing a reprogrammable central station for processing, programming, modifying and enhancing the operation of the main processor in providing the image at the intelligent imaging platform, and reprogramming any of the reprogrammable stages, including the reprogrammable central station, by the main processor or by any of the reprogrammable stages to operate the main processor in processing the image.

97. The method as set forth in claim 91 wherein:

the reprogrammable stages and the main processor are disposed in the intelligent imaging platform and wherein the operation of the intelligent imaging platform is provided by the main processor.

98. The method as set forth in claim 91 wherein:

the reprogrammable stages constitute software stages and the main processor constitutes a hardware stage.

99. The method as set forth in claim 98 wherein:

the software stages are operable to concentrate on certain aspects of the image in accordance with the reprogramming of the software stages, and wherein the hardware stage is operable to introduce to the intelligent imaging platform the certain aspects of the image reprogrammed by the software stages.

100. The method as set forth in claim 99, further comprising the steps of:

providing a reprogrammable preprocessor in the software stages for concentrating upon particular characteristics of the image in accordance with the programming of the preprocessor, and reprogramming any of the reprogrammable stages, including the preprocessor, by the main processor or by any of the reprogrammable stages to operate the main processor in processing the image.

101. The method as set forth in claim 98, further comprising the steps of:

providing a reprogrammable analyzer in the software stages for analyzing the image to identify particular characteristics of the image, and reprogramming any of the reprogrammable stages, including the analyzer, by the main processor or by any of the reprogrammable stages to operate the main processor in processing the image.

102. The method as set forth in claim 98, further comprising the steps of:

providing a reprogrammable post processor in the software stages for modifying the image in accordance with the programming of any of the reprogrammable stages, and reprogramming any of the reprogrammable stages, including the post processor, by the main processor or by any of the reprogrammable stages to operate the main processor in processing the image.

103. The method as set forth in claim 98, wherein:

the reprogrammable stages are disposed in the intelligent imaging platform.

104. A method of processing an image in an intelligent imaging platform, comprising the steps of:

acquiring information concerning the image for introduction to the intelligent imaging platform, processing the information with a main processor in the intelligent imaging platform, said intelligent imaging platform including a plurality of reprogrammable stages for reprogramming the operation of the intelligent imaging platform in processing the information, reprogramming any of the reprogrammable stages, the reprogramming being initiated by the main processor or by any one of the reprogrammable stages on the basis of a decision made by the main processor or by any one of the reprogrammable stages regarding the acquired information, to control the operation of the intelligent imaging platform in processing an image, providing a reprogrammable event generator in the software stages for making decisions with respect to particular characteristics of the image, and reprogramming any of the reprogrammable stages, including the event generator, by the main processor or by any of the reprogrammable stages to operate the main processor in processing the image.

105. A method of processing an image in an intelligent imaging platform, comprising the steps of:

acquiring information concerning the image for introduction to the intelligent imaging platform, processing the information with a main processor in the intelligent imaging platform, said intelligent imaging platform including a plurality of reprogrammable stages for reprogramming the operation of the intelligent imaging platform in processing the information, reprogramming any of the reprogrammable stages, the reprogramming being initiated by the main processor or by any one of the reprogrammable stages on the basis of a decision made by the main processor or by any one of the reprogrammable stages regarding the acquired information, to control the operation of the intelligent imaging platform in processing an image, providing a reprogrammable event responder in the software stages for providing action with respect to the particular characteristics of the image in accordance with decisions made by the event responder, and reprogramming any of the reprogrammable stages, including the reprogrammable event responder, by the main processor or by any of the reprogrammable stages to operate the main processor in processing the image.

106. A method of processing an image in an intelligent imaging platform, comprising the steps of:

acquiring information concerning the image for introduction to the intelligent imaging platform, processing the information with a main processor in the intelligent imaging platform, said intelligent imaging platform including a plurality of reprogrammable stages for reprogramming the operation of the intelligent imaging platform in processing the information, reprogramming any of the reprogrammable stages, the reprogramming being initiated by the main processor or by any one of the reprogrammable stages on the basis of a decision made by the main processor or by any one of the reprogrammable stages regarding the acquired information, to control the operation of the intelligent imaging platform in processing an image, the reprogrammable stages constitute software stages and the main processor constitutes a hardware stage, acquiring audio information relating to the image and for converting the audio information to signals representing the audio information; and providing a reprogrammable audio manipulator responsive to the audio signals for operating upon the audio signals to clarify the audio information represented by the audio signals;

the audio manipulator being reprogrammable by the audio manipulator in accordance with the results desired to be obtained in the image.

107. The method as set forth in claim 106 wherein:
the audio manipulator includes a reprogrammable preprocessor stage and a reprogrammable analyzer stage.

108. An apparatus for processing a visual image on an intelligent imaging platform, comprising:

a main processor to provide an image in the intelligent imaging platform, a plurality of reprogrammable stages each being reprogrammable, the reprogramming being initiated by the main processor or by any one of the reprogrammable stages on the basis of a decision made by the main processor or by any one of the reprogrammable stages regarding the image to control the operation of the intelligent imaging platform in accordance with the reprogramming of the reprogrammable stages, the reprogrammable stages include a reprogrammable field gate array for clarifying the image before the image is introduced to the main processor, each of the reprogrammable stages, including the reprogrammable field gate array, being reprogrammable by the main processor or by any of the reprogrammable stages during the reprogramming of any of the reprogrammable stages, to operate the main processor in processing the image in the intelligent imaging platform.

109. An apparatus for processing a visual image on an intelligent imaging platform comprising:

a main processor to provide an image in the intelligent imaging platform, a plurality of reprogrammable stages each being reprogrammable, at least one of the reprogrammable stages comprising a field reprogrammable gate array, the reprogramming of the field reprogrammable gate array being initiated by the main processor or by any one of the reprogrammable stages on the basis of a decision made by the main processor or by any one of the reprogrammable stages regarding the image to control the operation of the intelligent imaging platform in accordance with the reprogramming of the reprogrammable stages.

110. The apparatus as set forth in claim 109 wherein:
the reprogrammable stages and the main processor are disposed in the intelligent imaging platform, and wherein:
the image in the intelligent imaging platform is provided by the operation of the main processor in reprogramming the reprogrammable stages.

111. The apparatus as set forth in claim 109 wherein:
the reprogrammable stages are operable to concentrate on certain aspects of the image in accordance with the programming of the reprogrammable stages, and wherein:
the main processor is operable to introduce to the intelligent imaging platform the concentrated aspects of the image provided by the reprogrammable stages.

112. The apparatus as set forth in claim 109, wherein:
the reprogrammable stages include a reprogrammable software development kit for enabling a user to create software for prioritizing certain aspects of the image during the processing of the image by the main processor;
each of the reprogrammable stages, including the software created by the software development kit, being reprogrammable by the main processor or by any of the reprogrammable stages during the reprogramming of any of the reprogrammable stages, to operate the main processor in prioritizing the certain aspects of the image in the intelligent imaging platform.

113. The apparatus as set forth in claim 109, wherein:
the reprogrammable stages include a reprogrammable co-processor for manipulating the image before the image is processed by the main processor;
each of the reprogrammable stages, including the co-processor, being reprogrammable by the main processor or by the software stages during the reprogramming of any of the reprogrammable stages, to operate the main processor in processing the image in the intelligent imaging platform.

114. The apparatus as set forth in claim 109, wherein:
the reprogrammable stages include a reprogrammable central station for processing, programming, modifying and arranging the operation of the main processor in providing the image at the intelligent imaging platform,
each of the reprogrammable stages, including the reprogrammable central station, being reprogrammable by the main processor or by any of the reprogrammable stages during the reprogramming of any of the reprogrammable stages to operate the main processor in processing the image in the intelligent imaging platform.

115. The apparatus as set forth in claim 109, wherein:
the reprogrammable stages include a reprogrammable preprocessor for concentrating upon particular aspects of the image;
each of the reprogrammable stages, including the reprogrammable preprocessor, being reprogrammable by the main processor or by any of the reprogrammable stages during the reprogramming of any of the reprogrammable stages to operate the main processor in processing the image in the intelligent imaging platform.

116. The apparatus as set forth in claim 109, wherein:
the reprogrammable stages include a reprogrammable analyzer for identifying particular characteristics of the image;
each of the reprogrammable stages, including the analyzer, being reprogrammable by the main processor or by any of the reprogrammable stages during the reprogramming of any of the reprogrammable stages to operate the main processor in processing the image in the intelligent imaging platform.

117. The apparatus as set forth in claim 109, wherein:
reprogrammable stages include a reprogrammable event generator for making decisions with respect to particular characteristics of the image and emphasizing the particular individual characteristics of the image;
each of the reprogrammable stages, including the event generator, being reprogrammable by the main processor or by any of the reprogrammable stages, including the event generator, during the reprogramming of any of the reprogrammable stages, including the event generator, to operate the main processor in processing the image in the intelligent imaging platform.

118. The apparatus as set forth in claim 109, wherein:
the reprogrammable stages include a reprogrammable event responder for providing action with respect to particular characteristics of the image in accordance with the decisions made by the event responder;
each of the reprogrammable stages, including the event responder, being reprogrammable by the main processor or by any of the reprogrammable stages, including the event responder, during the reprogramming of any of the reprogrammable stages, including the event responder, to operate the main processor in processing the image in the intelligent imaging platform.

119. A method for processing an image, comprising the steps of:
acquiring information concerning the image;
processing the information in an intelligent imaging system having a plurality of reprogrammable stages to provide an image, at least one of the reprogrammable stages comprising a field reprogrammable gate array;
analyzing the information being processed by the system to enable the system to self-determine whether to reprogram any of the reprogrammable stages; and
automatically reprogramming the field reprogrammable gate array, the reprogramming being initiated by any one of the reprogrammable stages based upon the self-determination made in that stage or in another stage, to control the operation of the system in providing the image.

120. The method as set forth in claim 119, wherein the acquired information includes audio and video information.

121. An apparatus for processing an image, comprising:
an acquirer for acquiring information concerning the image and for converting the acquired information to signals representing the image; and
an intelligent imaging platform for processing the signals and providing an image, said intelligent imaging platform including one or more reprogrammable stages for controlling the processing of the signals, at least one of the reprogrammable stages comprising a field reprogrammable gate array,
the reprogramming of the field reprogrammable gate array being initiated by the intelligent imaging platform on the basis of a decision made by the intelligent imaging platform regarding the signals being processed.

122. The apparatus as set forth in claim 121, wherein the acquirer includes an image inquirer for receiving video information and for converting the video information to video signals representing the image, and an audio acquirer for receiving audio information and for converting the audio information to audio signals.

123. The apparatus as set forth in claim 121, wherein the reprogramming of the field reprogrammable gate array can be self-initiated on the basis of a decision made by the that stage comprising the field reprogrammable gate array regarding the signals being processed.

124. The apparatus as set forth in claim 121, wherein each of the reprogrammable stages can be reprogrammed on the basis of a decision from the stage or any of the other stages regarding the signals being processed.

125. The apparatus as set forth in claim 121, wherein the reprogramming of the field reprogrammable gate array occurs automatically in response to said decision.

126. The apparatus as set forth in claim 121, wherein the reprogrammable stages include at least one stage for manipulating the signals representing the image and at least one stage for controlling the operation of a main processor in processing the manipulated signals.

127. An apparatus for processing an image, comprising:
an acquirer for acquiring information concerning the image and for converting the acquired information to signals representing the image;
an intelligent imaging platform for processing the signals and providing an image, said intelligent imaging platform including one or more reprogrammable stages for controlling the processing of the signals, and
a software development kit in the intelligent imagining platform for enabling a user to create software to control the operation of the intelligent imaging platform.

128. The apparatus as set forth in claim 127, wherein said reprogrammable stages are reprogrammable by the intelligent imaging platform on the basis of a decision made by the intelligent imaging platform regarding the signals being processed.

129. The apparatus as set forth in claim 127, wherein said reprogrammable stages are reprogrammable by the software created by the software development kit.

130. The apparatus as set forth in claim 129, wherein said reprogrammable stages are reprogrammable by said software on the basis of a decision made by the software.

131. The apparatus as set forth in claim 130, wherein said reprogrammable stages are reprogrammable by said software on the basis of a decision made by the software regarding the signals being processed.

132. The apparatus as set forth in claim 131, wherein said reprogrammable stages are reprogrammable by said software on the basis of a decision made by the software in real time regarding the signals being processed.

133. A method of processing an image, comprising the steps of:
- acquiring the image;
- acquiring audio information;
- processing the acquired image with a main processor;
- manipulating the acquired audio information with a reprogrammable stage;
- processing the manipulated audio information from the reprogrammable stage with the main processor; and
- reprogramming the reprogrammable stage, the reprogramming being initiated by the main processor or the reprogrammable stage to enhance the manipulation of the acquired audio information by the reprogrammable stage on the basis of a decision made by the main processor or the reprogrammable stage regarding the acquired audio information.

134. A method of processing an image, comprising the steps of:
- acquiring the image;
- acquiring audio information;
- processing the acquired image and audio information with a main processor and one or more reprogrammable stages; and
- reprogramming at least one of the reprogrammable stages, the reprogramming being initiated by the main processor or the reprogrammable stages on the basis of a decision made by the main processor or the reprogrammable stages regarding the acquired audio information.

135. An apparatus for processing an image, comprising:
- an image acquirer for acquiring the image;
- an audio acquirer for acquiring audio information;
- a main processor for processing the acquired image and audio information; and
- one or more reprogrammable stages for manipulating the acquired image or for controlling the operation of the main processor in processing the image;
- said reprogrammable stages being reprogrammed, the reprogramming being initiated by the main processor or the reprogrammable stages on the basis of a decision made by the main processor or the reprogrammable stages regarding the acquired audio information.

136. An apparatus for processing an image, comprising:
- an image acquirer for acquiring the image;
- a audio acquirer for acquiring audio information;
- a reprogrammable stage for manipulating the acquired audio information; and
- a main processor for processing the acquired image and the manipulated audio information;
- said reprogrammable stage being reprogrammed, the reprogramming being initiated by the main processor or the reprogrammable stage to enhance the manipulation of the acquired audio information by the reprogrammable stage on the basis of a decision made by the main processor or the reprogrammable stage regarding the acquired audio information.

137. An apparatus for processing an image to provide a desired result, comprising:
- an intelligent imaging platform,
- an audio acquirer for receiving audio information,
- one or more reprogrammable stages responsive to audio information from the audio acquirer, and
- a main processor included in the intelligent imaging platform for providing a controlled operation of the intelligent imaging platform in processing the image in accordance with the audio information provided by the audio acquirer;
- each of the reprogrammable stages being included in the intelligent imaging platform, and being reprogrammable, the reprogramming being initiated by any of the reprogrammable stages or the main processor on the basis of a decision made by the reprogrammable stages or the main processor regarding the audio information.

138. An apparatus for processing an image to provide a desired result, comprising:
- an intelligent imaging platform,
- one or more inputs in the intelligent imaging platform for receiving signals from external devices,
- one or more reprogrammable stages responsive to signals from the inputs, at least one of the reprogrammable stages comprising a field reprogrammable gate array, and
- a main processor included in the intelligent imaging platform for providing a controlled operation of the intelligent imaging platform in processing the image in accordance with the signals provided by the inputs,
- each of the reprogrammable stages being included in the intelligent imaging platform, the reprogramming of the field reprogrammable gate array being initiated by any of the reprogrammable stages or the main processor on the basis of a decision made by the reprogrammable stages or the main processor regarding the signals from the inputs.

139. An apparatus for processing an image, comprising:
- an image acquirer for acquiring the image,
- a main processor for processing the acquired image, and
- one or more reprogrammable stages,
- both the main processor and each of the reprogrammable stages being configured to initiate a reprogramming of any of the reprogrammable stages on the basis of a decision made by the main processor or by any of the reprogrammable stages regarding the acquired image.

140. The apparatus as set forth in claim 139, wherein:
- at least one of the reprogrammable stages comprises a field reprogrammable gate array,
- the field programmable gate array being reprogrammable by the main processor or by any of the reprogrammable stages on the basis of a decision made by the main processor, or by any of the reprogrammable stages regarding the acquired image.

141. The apparatus as set forth in claim 139, further comprising a
- software development kit for enabling a user to create software to control the operation of the main processor and the reprogrammable stages.

142. The apparatus as set forth in claim 139, wherein
- the main processor and the reprogrammable stages are disposed in an intelligent imaging platform.

143. An apparatus for processing an image, comprising:
- an image acquirer for acquiring the image,
- a main processor for processing the acquired image,
- one or more reprogrammable stages, and a software development kit for enabling a user to create software to control the operation of the main processor and the reprogrammable stages.

144. The apparatus as set forth in claim 143, wherein the software created with the software development kit is capable of reprogramming any one of the reprogrammable stages.

145. The apparatus as set forth in claim 143, wherein the software created with the software development kit is capable of reprogramming any one of the reprogrammable stages on the basis of a decision made by the software created with the software development kit.

146. The apparatus as set forth in claim 143, wherein the software created with the software development kit is capable of reprogramming of any one of the reprogrammable stages on the basis of a decision made by the software created with the software development kit regarding the acquired image.

* * * * *

UNITED STATES PATENT AND TRADEMARK OFFICE
CERTIFICATE OF CORRECTION

PATENT NO. : 8,411,151 B2  
APPLICATION NO. : 10/113480  
DATED : April 2, 2013  
INVENTOR(S) : Gregory A. Bone et al.

Page 1 of 7

It is certified that error appears in the above-identified patent and that said Letters Patent is hereby corrected as shown below:

In the Specifications

Column 1, line 17, after "such as an" delete "enclosure." and insert instead --enclosure (e.g. a room).--.
    line 51, between "controls" and "in" delete "a camera" and insert instead --an intelligent imaging platform--.
    line 61, before "a diagram," delete "FIG. 1 is" and insert instead --FIGS. 1-A and 1-B show--.
    line 67, after "shown in" delete "FIG. 1" and insert instead --FIGS. 1-A and 1-B--.

Column 2, line 2, after "hardware in" delete "FIG. 1" and insert instead -- FIGS. 1A and 1-B--.
    line 21, before "a chart" delete "FIG. 7 is" and insert instead --FIGS. 7-A through 7-D are--.
    line 29, before "a circuit diagram," delete "FIG. 1 is" and insert instead --FIGS. 1-A and 1-B show--.
    line 45, after "section in," delete "FIG. 1" and insert instead --FIGS. 1-A and 1-B--.

Column 3, line 48, between "to" and "the" delete "control" and insert instead --process--.
    line 49, between "the" and "and" delete "camera" and insert instead --intelligent imaging platform 18--.
    line 50, after "the" delete "camera" and insert instead --intelligent imaging platform--.
    line 52, between "clarify" and "the video" delete "and sharpen" and insert instead --and/or sharpen or otherwise process--.
    line 63, between "the" and "that" delete "camera" and insert instead Signed and Sealed this  
Sixteenth Day of July, 2013

Teresa Stanek Rea  
*Acting Director of the United States Patent and Trademark Office*

--intelligent imaging platform 18--.
line 64, after "inform the" delete "camera" and insert instead --intelligent imaging platform--.

Column 4, line 2, before "other than" delete "function" and insert instead --functions--.
line 23, between "the" and "intelligent" delete "camera".
line 24, between "platform" and "60" insert --user interface--.
line 24, between "60" and "that" delete "calculates" and insert instead --processes--.
lines 24-25, after "presents the" delete cal-culated" and insert instead --processed--.
line 26, after "of the" delete "camera." and insert instead --intelligent imaging platform 18.--.
line 28, between "the" and "to" delete "camera" and insert instead --intelligent imaging platform--.
line 29, between "the" and "It" delete "camera." and insert instead --intelligent imaging platform 18.--.
line 36, after "bus" delete "25" and insert instead --75--.
line 39, between "channels" and "70" insert -- -for example, channels--.
line 45, between "to" and "The" delete "hardware." and insert instead --the main processing hardware 66.--.
line 54, between "in" and "the" delete "FIG. 1," and insert instead --FIG. 1-A ,--.

Column 5, line 1, between "image" and "and" delete "from the camera".
line 6, after "manipulates the" delete "clarified" and insert instead --processed--.

CERTIFICATE OF CORRECTION (continued)
U.S. Pat. No. 8,411,151 B2 line 8, between "in" and "For" delete "FIG. 1." and insert instead
--FIGS. 1-A and 1-B.--.
line 20, between "image" and "." insert --or otherwise processes the acquired image--.
line 26, between "in" and "has" delete "FIG. 1" and insert instead –FIGS. 1-A and 1-B--.
line 28, between "the" and "to" delete "camera" and insert instead
--intelligent imaging platform 18--.
line 29, between "the" and "In" delete "camera." and insert instead
--platform--.
line 30, after "in the" delete "camera" and insert instead --intelligent imaging platform 18--.
line 32, between "the" and "This" delete "camera." and insert instead
--intelligent imaging platform--.
line 34, between "the" and "In" delete "camera." and insert instead
--intelligent imaging platform--.
line 35, between "the" and "and" delete "camera" and insert instead
--intelligent imaging platform--.
line 36, between "the" and "As" delete "camera." and insert instead
--intelligent imaging platform--.
line 37, between "the" and "and" delete "camera" and insert instead
--platform--.
line 38, after "outside of the" delete "camera" and insert instead
--system--.
line 39, between "the" and "performance." delete "camera" and insert instead --system--.
line 42, after "processed" delete "many of the camera systems of the prior art"

CERTIFICATE OF CORRECTION (continued)
U.S. Pat. No. 8,411,151 B2 and insert instead --. Many of the systems of the prior art have--.
line 45, before "controls" delete "camera".
line 45, between "the" and "the digital" delete "camera," and insert instead --intelligent imaging platform 18--.
line 47, between "reliability" and "of the system 10." delete "of the operation" and insert instead --and functionality--.
line 52, between "62 and "and" insert --(even numbers only)--.
line 56, between "the" and "thereby" delete "camera," and insert instead --intelligent imaging platform 18,--.
line 57, after "performance of the" delete "camera." and insert instead --platform.--.
line 63, before "a format" delete "FIG. 1" and insert instead --FIG. 1-B--.

Column 6, line 2, between "having" and "Alternatively," delete "a particular identity." and insert instead --particular facial features.--.
line 6, after "connection with" delete "FIG. 1." and insert instead --FIGS. 1-A. and 1-B--.
line 7, between "analyzer" and "is" delete "92" and insert instead --94--.
line 11, between "analyzer" and "and" delete "96" and insert instead --94--.
line 15, between "in" and "and" delete "FIG. 1" and insert instead --FIG. 1-A--.
line 17, after "shown in" delete "FIG. 1." and insert instead --FIG. 1-A.--.
line 18, between "in" and "is" delete "FIG. 1" and insert instead --FIG. 1-B--.
line 23, between "the" and "The" delete "camera." and insert instead --lens of the intelligent imaging platform 18.--.

CERTIFICATE OF CORRECTION (continued)
U.S. Pat. No. 8,411,151 B2 line 24, between "in" and "is" delete "FIG. 1" and insert instead --FIG. 1-B--.
    line 31, between "in" and "The" delete "FIG. 1." and insert instead --FIG. 1-A--.
    line 39, before "The platform" delete "FIG. 1" and insert instead --FIG. 1-B--.
    line 40, after "(OEM)" delete "compiles" and insert instead --requirements--.
    line 43, after "stages can" delete "talk to" and insert instead --communicate with--.
    line 50, between "in" and "The" delete "FIG. 1." and insert instead --FIGS. 1-A and 1-B.--.
    line 51, between "FIGS." and "and" delete "1" and insert instead --1-B--.
    line 57, between "in" and "The" delete "FIG. 1." and insert instead --FIG. 1-B--.
    line 59, after "shown in" delete "FIG. 1." and insert instead --FIG. 1-B--.
    line 63, between "buses" and "and" delete "120" and insert instead --31--.

Column 7, line 1, between "in" and "As" delete "FIG. 1." and insert instead --FIG. 1-A--.
    line 8, between "with" and "and" delete "FIG. 1" and insert instead --FIGS. 1-A and 1-B--.
    line 16, before "and 2" delete "1" and insert instead --1-B--.

Column 8, line 11, between "and" and "other" insert --many of the--.
    line 12, between "blocks" and ". When" insert --in the system shown in the drawings--.

CERTIFICATE OF CORRECTION (continued)
U.S. Pat. No. 8,411,151 B2 line 20, after "arrow 64." insert --As will be appreciated from the previous discussion, most of the blocks shown in the drawings are reprogrammable.--.
line 21, before "is a chart" delete "FIG. 7" and insert instead --FIGS. 7-A through 7-D--.
line 23, between "that" and "shows" delete "FIG. 7" and insert instead --FIGS. 7-A through 7-D--.
line 25, between "in" and "indicates" delete "FIG. 7" and insert instead --FIGS. 7-A and 7-C--.
line 32, between "in" and "is" delete "FIG. 7" and insert instead --FIGS. 7-A and 7-C--.
line 44, between "in" and "indicates" delete "FIG. 7" and insert instead --FIGS. 7-A and 7-C--.
line 51, between "in" and "is" delete "FIG. 7" and insert instead --FIGS. 7-A and 7-C--.
line 52, between "of" and "This" delete "FIG. 7." and insert instead --FIGS. 7-A and 7-C--.
line 54, after "of" delete "FIG. 7." and insert instead --FIGS. 7-A through 7-D.--.
line 55, before "indicates" delete "FIG. 7" and insert instead --FIGS. 7-A through 7-D--.
line 56, between "of" and "for" delete "FIG. 7" and insert instead --FIGS. 7-A and 7-C--.
line 57, between "of" and "For" delete "FIG. 7." and insert instead --FIGS. 7-A and 7-C.--.
line 63, between "of" and "indicates" delete "FIG. 7" and insert instead --FIGS. 7-A and 7-C--.
line 64, between "FIGS." and "and" delete "1" and insert instead --1-A--.

CERTIFICATE OF CORRECTION (continued)
U.S. Pat. No. 8,411,151 B2 line 65, between "of" and "In" delete "FIG. 7." and insert instead --FIGS. 7-A and 7-C.--.
line 65, after "6 in" delete "FIG. 7" and insert instead --FIGS. 7-A and 7-C--.
line 66, after "FIGS." delete "1" and insert instead --1-A--.
line 67, after "1 of" delete "FIG. 7." and insert instead --FIGS. 7-A and 7-C.--.

Column 9, line 1, between "in" and "indicates" delete "FIG. 7" and insert instead --FIGS. 7-B and 7-D--.
line 3, between "of" and "The" delete "FIG. 7." and insert instead --FIGS. 7-A and 7-C.--.
line 4, between "of" and "for" delete "FIG. 7" and insert instead --FIGS. 7-B and 7-D--.
line 5, between "of" and "The" delete "FIG. 7." and insert instead --FIGS. 7-A and 7-C.--.
line 6, between "in" and "perform" delete "FIG. 1" and insert instead --FIG. 1-A--.
line 7, between "of" and "when" delete "FIG. 7" and insert instead --FIGS. 7-B and 7-D--.
line 8, between "of" and "and" delete "FIG. 7" and insert instead --FIGS. 7-A and 7-C--.
line 9, after "2 of" delete "FIG. 7." and insert instead --FIGS. 7-A and 7-C.--.
line 10, between "of" and "indicates" delete "FIG. 7" and insert instead --FIGS. 7-B and 7-D--.
line 12, between "of" and "is" delete "FIG. 7" and insert instead --FIGS. 7-A and 7-C--.
line 13, between "in" and "The" delete "FIG. 1." and insert instead --FIG. 1-B.--
line 15, between "of" and "for" delete "FIG. 7" and insert instead --FIGS. 7-B and 7-D--.
line 16, between "of" and "In" delete "FIG. 7." and insert instead --FIGS. 7-A and 7-C.--.
line 18, between "of" and "for" delete "FIG. 7" and insert instead --FIGS. 7-B and 7-D--.
line 19, between "of" and "The" delete "FIG. 7." and insert instead --FIGS. 7-A and 7-C.--.
line 20, between "of" and "is" delete "FIG. 7" and insert instead --FIGS. 7-B and 7-D--.
line 24, between "of" and "As" delete "FIG. 7." and insert instead --FIGS. 7-A and 7-C.--.
line 27, after "2 of" delete "FIG.7." and insert instead --FIGS. 7-A and 7-C.--.
line 59, after "reprogrammable" delete "stage" and insert instead --stages--.

In the Claims

Column 34, line 34, between "the" and "stage" delete "that".